United States Patent
Line et al.

(10) Patent No.: US 10,220,750 B2
(45) Date of Patent: Mar. 5, 2019

(54) INNER CARRIER SUBSTRATE MECHANICAL LOCK WITH HEAD RESTRAINT GUIDE SLEEVES

(71) Applicant: FORD GLOBAL TECHNOLOGIES, LLC, Dearborn, MI (US)

(72) Inventors: Johnathan Andrew Line, Northville, MI (US); Christian J. Hosbach, Taylor, MI (US); Marcos Silva Kondrad, Macomb Township, MI (US); Rodney Charles Brinker, Eastpointe, MI (US); Nicholas Alphonse Billardello, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 249 days.

(21) Appl. No.: 15/229,258

(22) Filed: Aug. 5, 2016

(65) Prior Publication Data

US 2018/0037143 A1 Feb. 8, 2018

(51) Int. Cl.
*B60N 2/58* (2006.01)
*B60N 2/64* (2006.01)
(Continued)

(52) U.S. Cl.
CPC ........... *B60N 2/809* (2018.02); *B60N 2/5825* (2013.01); *B60N 2/64* (2013.01); *B60N 2/646* (2013.01);
(Continued)

(58) Field of Classification Search
CPC ...... B60N 2/5816; B60N 2/5825; B60N 2/64; B60N 2/643; B60N 2/646; B60N 2/68;
(Continued)

(56) References Cited

U.S. PATENT DOCUMENTS 4,746,168 A * 5/1988 Bracesco ............. B60N 2/5816
297/284.11
4,805,962 A 2/1989 Sacco et al.
(Continued)

FOREIGN PATENT DOCUMENTS

EP 2949445 A1 * 12/2015 ............. B60N 2/646
GB 2524613 A * 9/2015 ............... B60N 2/58
(Continued)

OTHER PUBLICATIONS

Machine Translation of JP2012106578, http://translationportal.epo.org/emtp/translate/?ACTION=description-retrieval&COUNTRY=JP&ENGINE=google&FORMAT=docdb&KIND=A&LOCALE=en_EP&NUMBER=2012106578&OPS=ops.epo.org/3.2&SRCLANG=ja&TRGLANG=en, Jun. 6, 2018 (Year: 2018).*

*Primary Examiner* — Ryan D Kwiecinski
(74) *Attorney, Agent, or Firm* — Vichit Chea; Price Heneveld LLP

(57) ABSTRACT

A motor vehicle a motor vehicle seating assembly for a motor vehicle has a lower seat assembly and an upwardly extending seat back assembly. The upwardly extending seat back assembly comprises a head restraint having a head restraint pad and a head restraint mounting post depending therefrom, a seat back frame having a vertically oriented frame opening in an upper portion thereof, a seat back and suspension module having an upper portion and a vertically oriented module opening in the upper portion, the frame opening and the module opening being in vertical alignment one with the other, and a head restraint guide sleeve vertically received and retained within the frame opening and the module opening, wherein the head restraint mounting post is received and retained within the head restraint guide sleeve.

16 Claims, 17 Drawing Sheets

(51) Int. Cl.
  *B60N 2/70* (2006.01)
  *B60N 2/809* (2018.01)
  *B60N 2/897* (2018.01)

(52) U.S. Cl.
  CPC ............ *B60N 2/7094* (2013.01); *B60N 2/897* (2018.02); *B60N 2205/30* (2013.01)

(58) Field of Classification Search
  CPC ................. B60N 2/7094; B60N 2/897; B60N 2002/899; B60N 2205/30
  See application file for complete search history.

(56) References Cited

U.S. PATENT DOCUMENTS

| | | | |
|---|---|---|---|
| 5,826,946 A | 10/1998 | Matthews et al. | |
| 5,879,055 A | 3/1999 | Dishner et al. | |
| 5,882,073 A | 3/1999 | Burchi et al. | |
| 5,918,943 A | 7/1999 | Mitschelen et al. | |
| 5,988,757 A | 11/1999 | Vishey et al. | |
| 6,070,942 A | 6/2000 | Barton et al. | |
| 6,152,534 A | 11/2000 | Maeda et al. | |
| 6,199,948 B1 | 3/2001 | Bush et al. | |
| 6,302,487 B1 | 10/2001 | Fujita et al. | |
| 6,485,103 B1 | 11/2002 | Yamada et al. | |
| 7,077,478 B2 | 4/2006 | Nakamura | |
| 7,108,327 B2 | 9/2006 | Locke et al. | |
| 7,222,915 B2 | 5/2007 | Philippot et al. | |
| 7,401,852 B2 | 7/2008 | Humer et al. | |
| 7,410,219 B2 | 8/2008 | Kraft et al. | |
| 7,731,294 B2 | 6/2010 | Yasuda et al. | |
| 7,850,246 B2 | 12/2010 | Kolich et al. | |
| 7,850,247 B2 | 12/2010 | Stauske et al. | |
| 7,905,551 B2 | 3/2011 | Sung et al. | |
| 8,297,708 B2 * | 10/2012 | Mizobata | B60N 2/7011 297/230.11 |
| 8,474,913 B2 | 7/2013 | Line et al. | |
| 8,474,917 B2 | 7/2013 | Line et al. | |
| 8,540,318 B2 | 9/2013 | Folkert et al. | |
| 8,590,978 B2 | 11/2013 | Jaranson et al. | |
| 8,708,418 B2 | 4/2014 | Mizobata | |
| 8,727,374 B1 | 5/2014 | Line et al. | |
| 8,801,094 B2 | 8/2014 | Nishiura et al. | |
| 8,857,908 B2 | 10/2014 | Brncick et al. | |
| 8,894,154 B2 | 11/2014 | Kulkarni et al. | |
| 8,985,685 B2 | 3/2015 | Line et al. | |
| 9,073,467 B2 * | 7/2015 | Awata | B60N 2/5825 |
| 9,409,504 B2 | 8/2016 | Line et al. | |
| 9,505,329 B2 * | 11/2016 | Mori | B60N 2/5825 |
| 9,669,744 B2 | 6/2017 | Cao et al. | |
| 2002/0033630 A1 | 3/2002 | Takata | |
| 2002/0041121 A1 | 4/2002 | Takata | |
| 2002/0050729 A1 * | 5/2002 | Nakano | B60N 2/838 297/216.12 |
| 2002/0096932 A1 | 7/2002 | Fujita et al. | |
| 2004/0183356 A1 * | 9/2004 | Philippot | B60N 2/70 297/452.18 |
| 2008/0136240 A1 | 6/2008 | Matthews et al. | |
| 2008/0252111 A1 | 10/2008 | Rothkop et al. | |
| 2008/0277987 A1 | 11/2008 | Deadrick | |
| 2010/0117411 A1 | 5/2010 | Fujita et al. | |
| 2011/0101744 A1 | 5/2011 | Naughton et al. | |
| 2012/0161481 A1 | 6/2012 | Tache et al. | |
| 2012/0313409 A1 | 12/2012 | Michalak | |
| 2013/0009442 A1 | 1/2013 | Burnham | |
| 2013/0082504 A1 | 4/2013 | Archambault | |
| 2013/0127215 A1 | 5/2013 | Dumont | |
| 2013/0257120 A1 | 10/2013 | Tracht et al. | |
| 2014/0203603 A1 | 7/2014 | Line et al. | |
| 2015/0008716 A1 | 1/2015 | Dry et al. | |
| 2015/0145303 A1 | 5/2015 | Line et al. | |
| 2015/0165948 A1 | 6/2015 | Kish | |
| 2015/0321614 A1 | 11/2015 | Line et al. | |
| 2015/0343929 A1 | 12/2015 | Yasuda | |
| 2016/0129818 A1 * | 5/2016 | Sahashi | B60N 2/70 297/452.61 |
| 2017/0008433 A1 * | 1/2017 | Shiotsu | B60N 2/80 |
| 2018/0037148 A1 * | 2/2018 | Line | B60N 2/809 |

FOREIGN PATENT DOCUMENTS

| | | | | |
|---|---|---|---|---|
| JP | 2012106578 A | * | 6/2012 | ............... B60N 2/68 |
| WO | WO-2013014800 A1 | * | 1/2013 | ........... B60R 21/207 |
| WO | WO-2018003280 A1 | * | 1/2018 | ............... A47C 7/38 |

\* cited by examiner

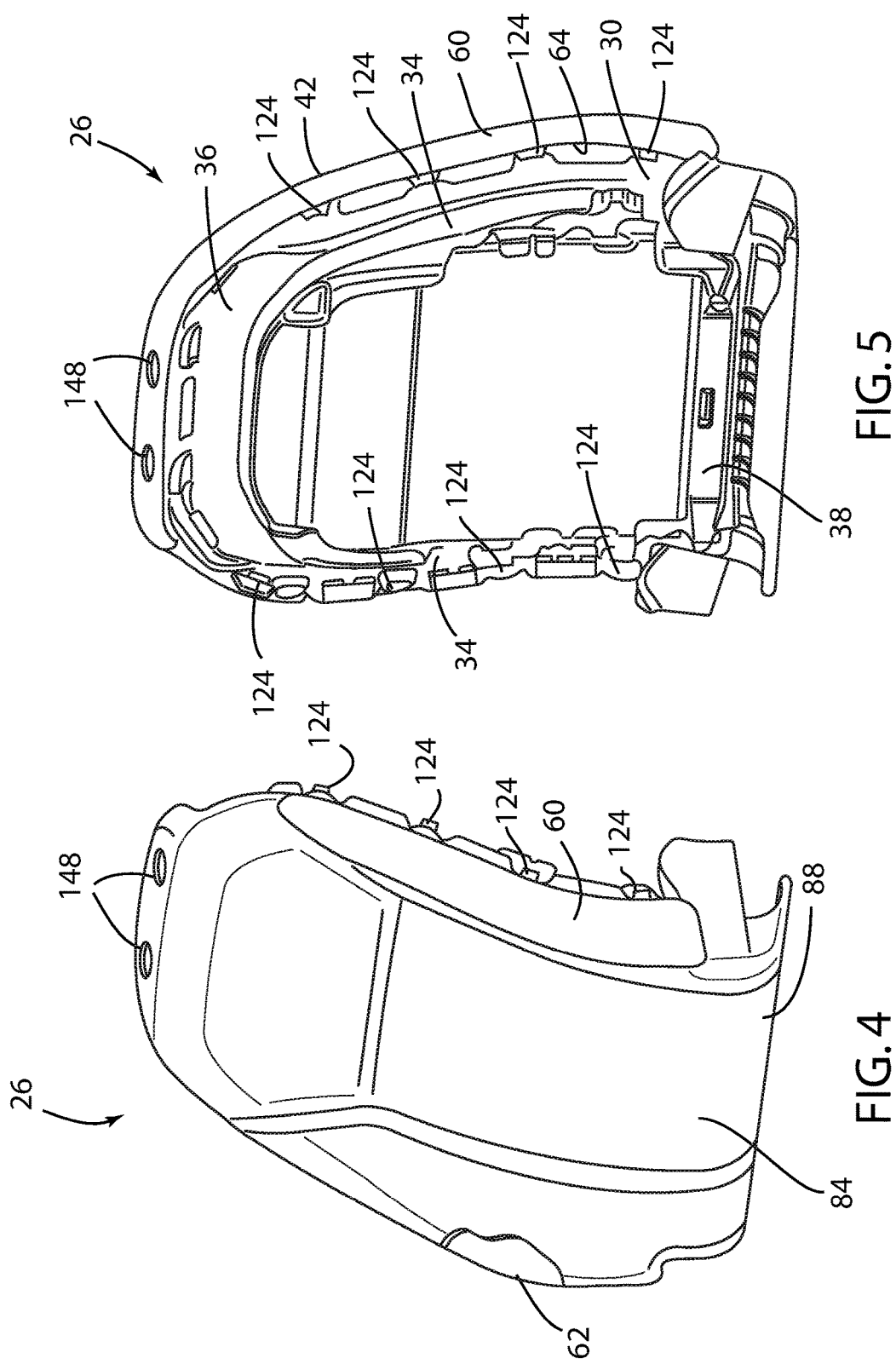

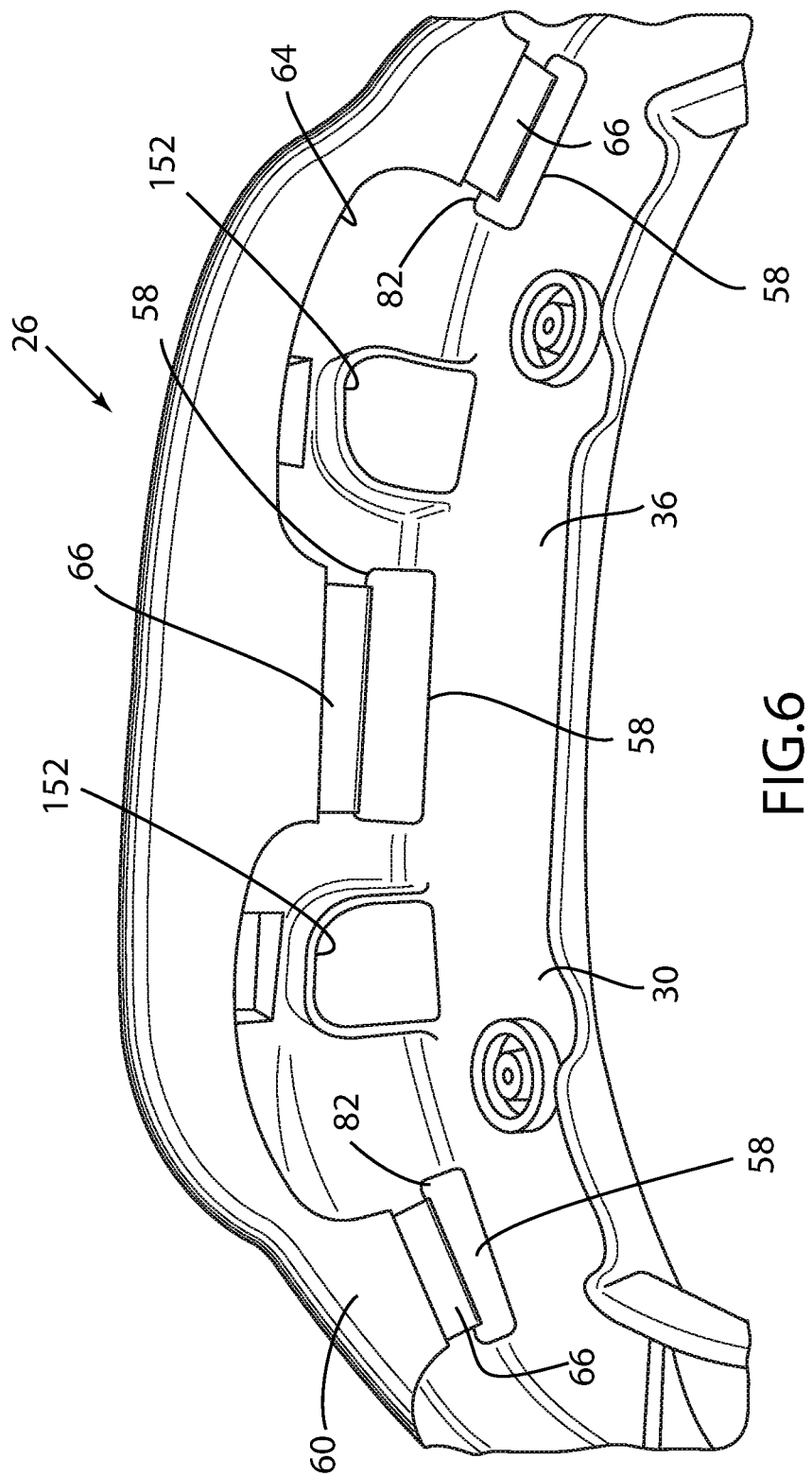

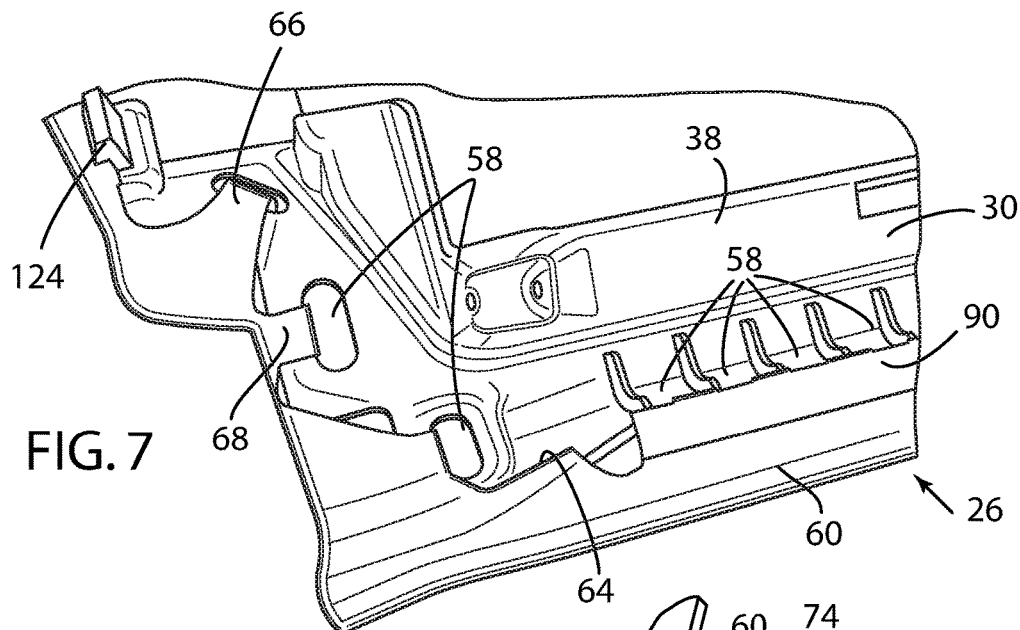
FIG. 7
FIG. 8A
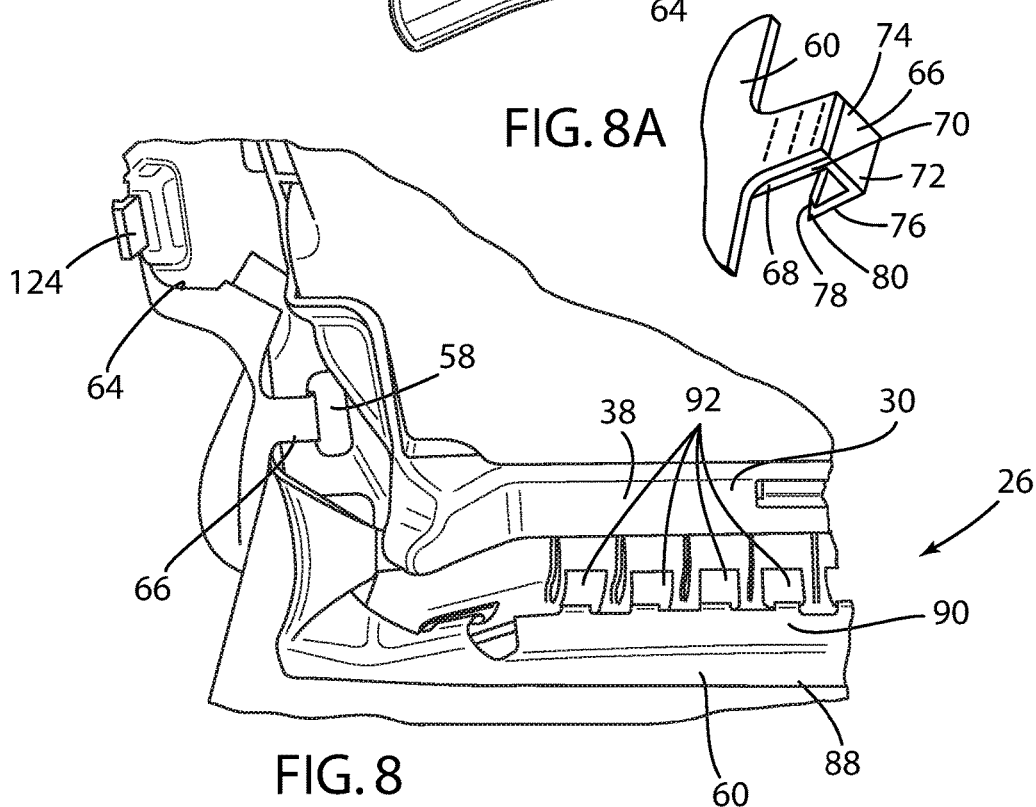
FIG. 8

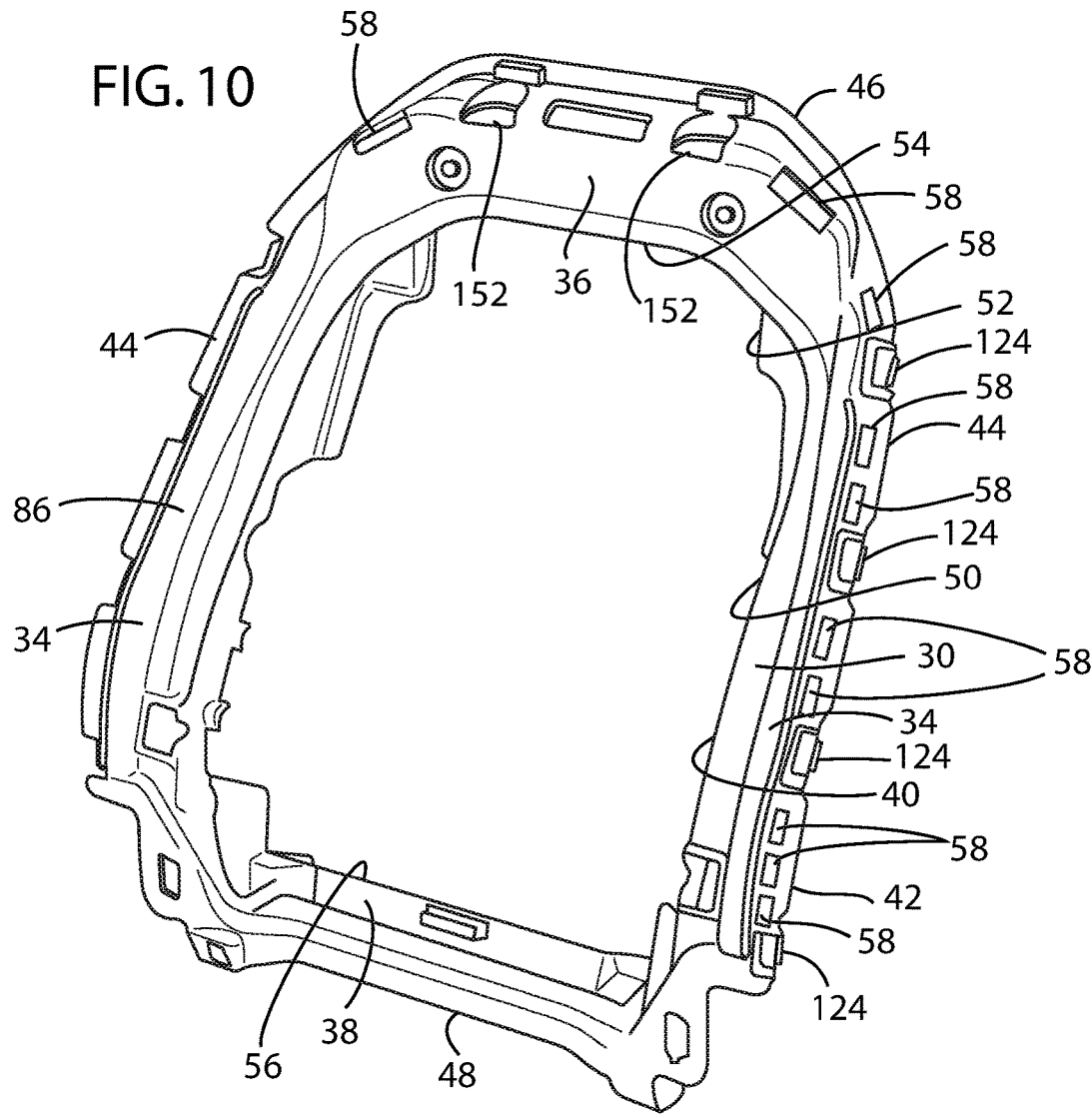

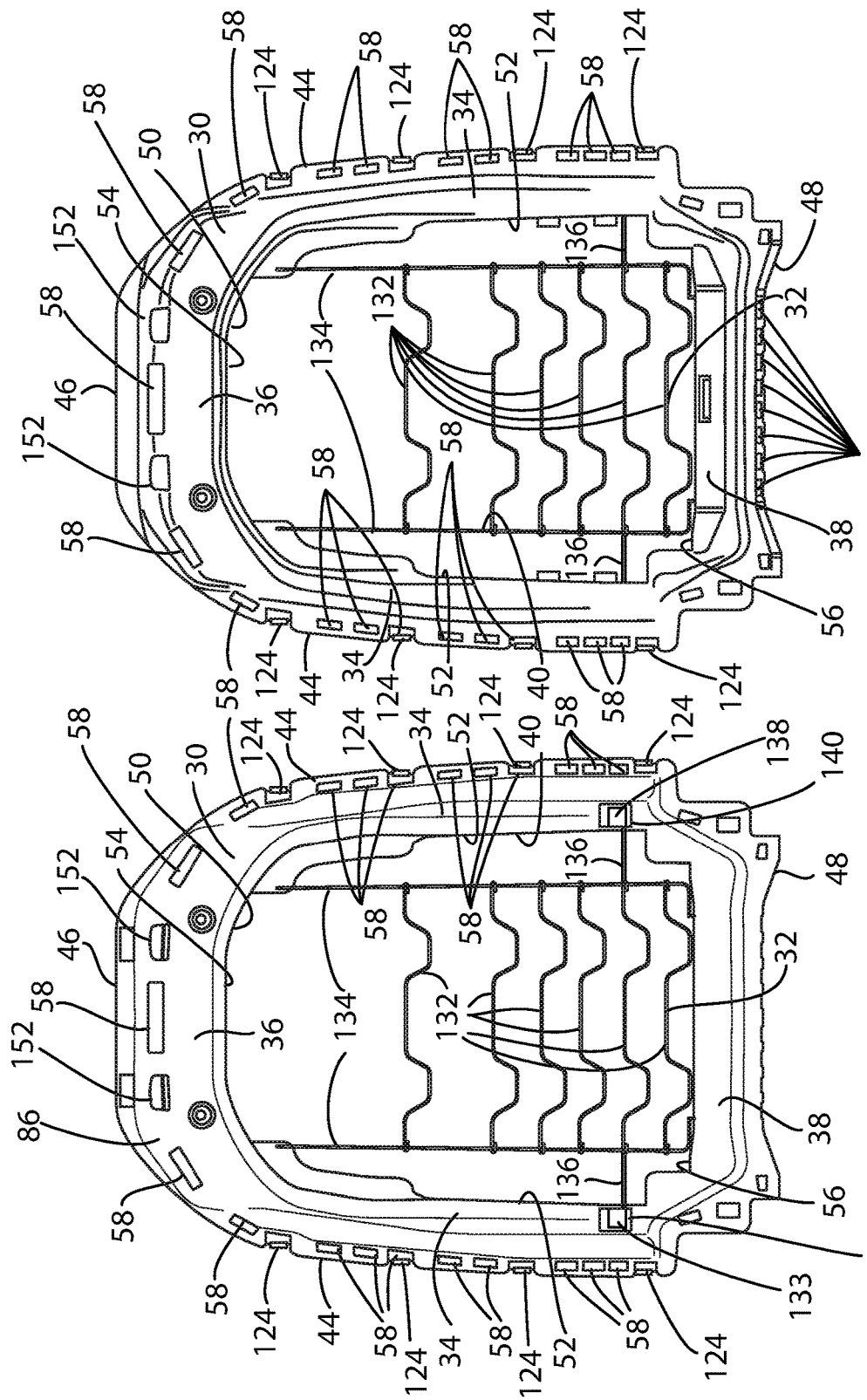

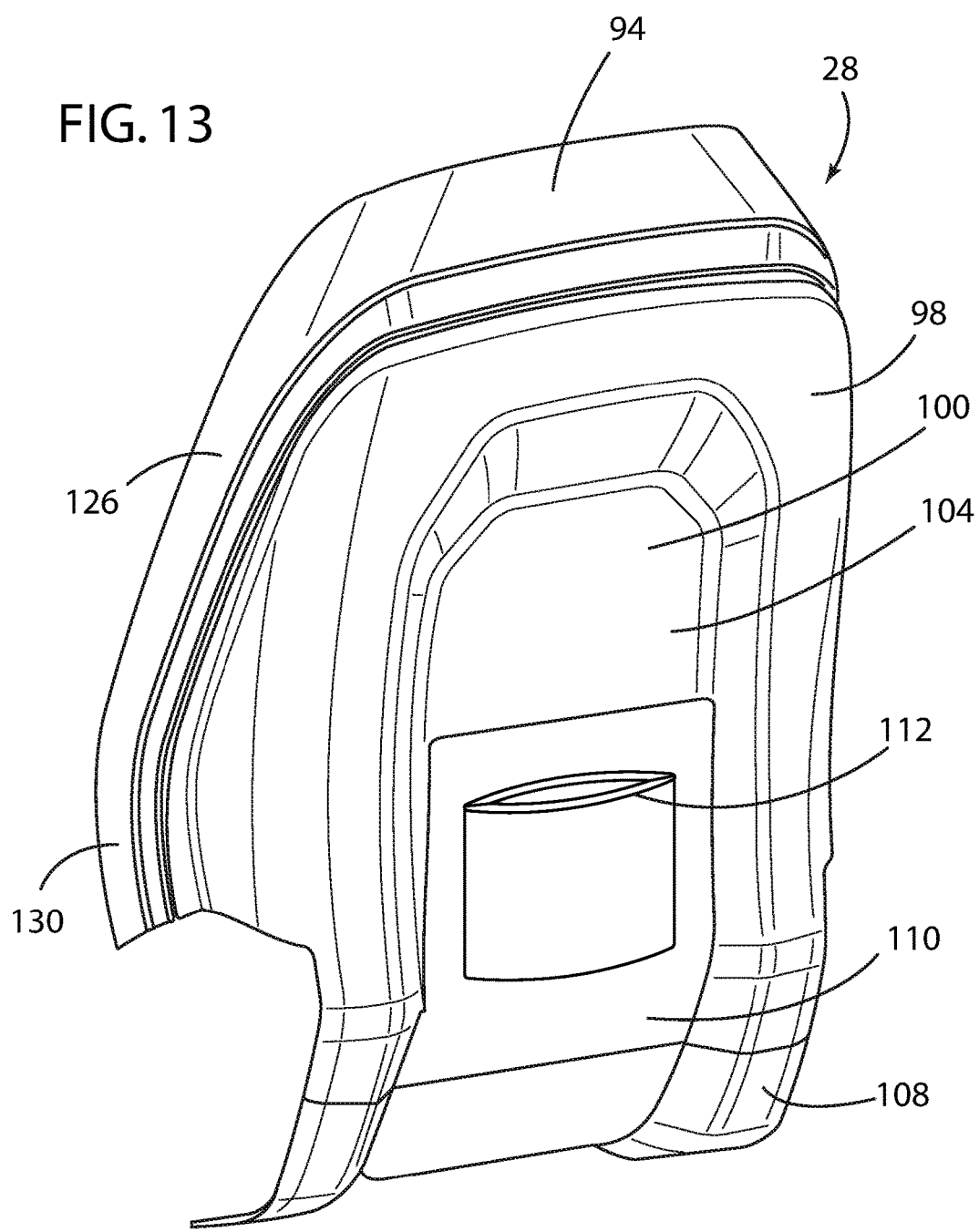

INNER CARRIER SUBSTRATE MECHANICAL LOCK WITH HEAD RESTRAINT GUIDE SLEEVES

FIELD OF THE INVENTION

The present disclosure generally relates to a mechanical lock for a one-piece composite inner carrier substrate and seat back frame of an upwardly extending seat back of a seating assembly for a motor vehicle and, more particularly, a pair of head restraint guide sleeves fitted to an upper portion of the one-piece composite inner carrier substrate and an upper portion of the seat back frame to mechanically lock the one-piece composite inner carrier substrate to the seat back frame.

BACKGROUND OF THE INVENTION

Modern motor vehicle seating assemblies are becoming more and more comfortable as designers improve their understanding of human ergonomics, posture, and comfortability. Vehicle seating assemblies that include comfort components in the motor vehicle seating assembly that can provide the driver and passengers with improved comfort and increased endurance for extensive vehicle rides. However, various sizes and shapes of drivers and passengers can prove challenging when providing motor vehicle seating assemblies. Accordingly, aesthetically attractive motor vehicle seating assemblies that include components optimized to accommodate the different sizes and shapes of drivers and passengers, as well as the desired posture and sitting positions of those drivers and passengers, has become increasingly important.

As a consequence, contemporary motor vehicle seating assemblies now incorporate hundreds of discrete parts. The assembly of such contemporary motor vehicle seating assemblies requires bringing together these hundreds of parts to be assembled into a final motor vehicle seating assembly, typically employing so-called "Kanban" or "Just-In-Time" ("JIT") assembly processes to achieve the completed motor vehicle seat assembly. Using such assembly processes, it has been found to be advantageous to modularize the motor vehicle seating assembly into discrete subassemblies in order to reduce the costs of final assembly. This allows the subassemblies to be sourced from a location independent of the final JIT assembly plant. An improved motor vehicle seating assembly module design to achieve all of the needs of the motor vehicle seating assembly, particularly a design that positively and conveniently couples the one-piece composite inner carrier substrate to the seat back frame, was desired.

SUMMARY OF THE INVENTION

According to one aspect of the present disclosure, a motor vehicle seating assembly for a motor vehicle has a lower seat assembly and an upwardly extending seat back assembly. The upwardly extending seat back assembly comprises a head restraint having a head restraint pad and a head restraint mounting post depending therefrom, a seat back frame having a vertically oriented frame opening in an upper portion thereof, a seat back and suspension module having an upper portion and a vertically oriented module opening in the upper portion, the frame opening and the module opening being in vertical alignment one with the other, and a head restraint guide sleeve vertically received and retained within the frame opening and the module opening, wherein the head restraint mounting post is received and retained within the head restraint guide sleeve.

According to another aspect of the present disclosure, a seat back assembly comprises a head restraint, a seat back frame having an opening in an upper portion thereof, a seat back and suspension module having an opening in an upper portion thereof, the frame opening and the module opening being in vertical alignment one with the other, and a head restraint guide sleeve received and retained within the frame opening and the module opening.

According to yet another aspect of the present disclosure, a motor vehicle seating assembly comprising a lower seat assembly and an upwardly extending seat back assembly, the upwardly extending seat back assembly comprising a head restraint having a head restraint pad and a head restraint mounting post depending from the head restraint pad, a seat back frame having a vertically oriented frame opening in an upper portion thereof, a seat back and suspension module attached to the seat frame, the seat back and suspension module further comprising a one-piece composite inner carrier substrate having a pair of vertically extending side members, an upper transverse member having a vertically oriented module opening, the frame opening and the module opening being in vertical alignment one with the other, and a lower transverse member, wherein an outer edge of each of the side members, upper transverse member, and lower transverse member form an outer perimeter, and a seat back trim cover having an outer perimeter having a plurality of seat back trim cover attachment fasteners disposed about a perimeter of the seat back trim cover at locations corresponding to the discrete locations of the outer perimeter of the inner carrier substrate, and a head restraint guide sleeve received and retained within the frame opening and the module opening, wherein the head restraint mounting post is received within the head restraint guide sleeve.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4 is a front side perspective view of the seat back and suspension module of the motor vehicle seating assembly of FIG. 1 according to the present disclosure;

FIG. 5 is a rear side perspective view of the seat back and suspension module of the motor vehicle seating assembly of FIG. 1 according to the present disclosure;

FIG. 6 is a rear perspective view of an upper portion of the seat back and suspension module of the motor vehicle seating assembly of FIG. 1 according to the present disclosure;

FIG. 7 is a rear perspective view of a lower portion of the seat back and suspension module of the motor vehicle seating assembly of FIG. 1 according to the present disclosure;

FIG. 8 is another rear perspective view of a lower portion of the seat back and suspension module of the motor vehicle seating assembly of FIG. 1 according to the present disclosure;

FIG. 8A is an enlarged perspective view of a seat back trim cover attachment fastener of the seat back and suspension module of the motor vehicle seating assembly of FIG. 1 according to the present disclosure;

FIG. 10 is a front side perspective view of the one-piece composite inner carrier substrate of the seat back and suspension module of the motor vehicle seating assembly of FIG. 1 according to the present disclosure;

FIG. 11 is a front view of the one-piece composite inner carrier substrate of the seat back and suspension module of the motor vehicle seating assembly of FIG. 1 according to the present disclosure;

FIG. 12 is a rear view of the one-piece composite inner carrier substrate of the seat back and suspension module of the motor vehicle seating assembly of FIG. 1 according to the present disclosure;

FIG. 13 is a rear side perspective view of the decorative seat back rear panel module of the motor vehicle seating assembly of FIG. 1 according to the present disclosure;

DETAILED DESCRIPTION OF THE EMBODIMENTS

Figure 1:
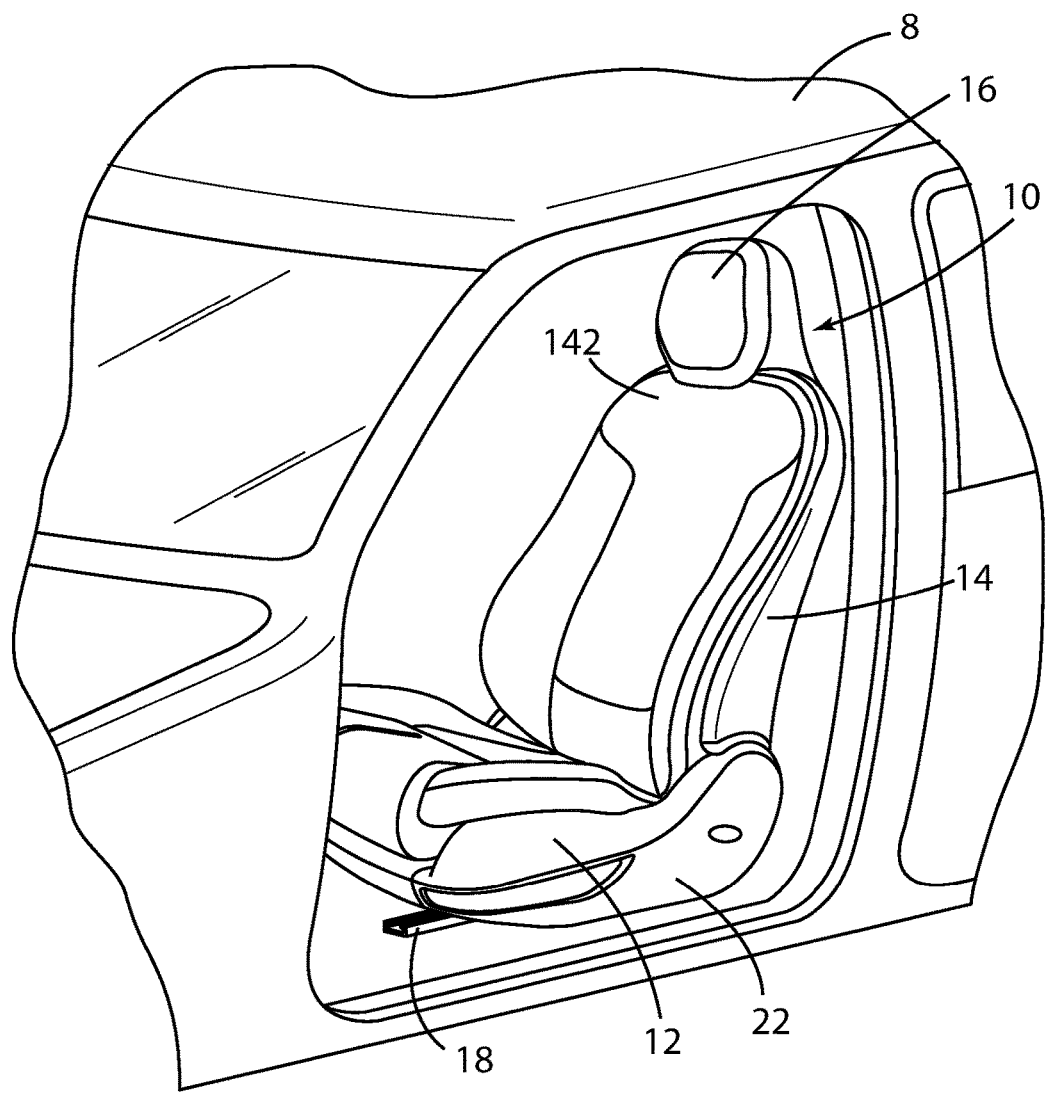
FIG. 1 is a front side perspective view of motor vehicle provided with the motor vehicle seating assembly of the present disclosure.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 2:
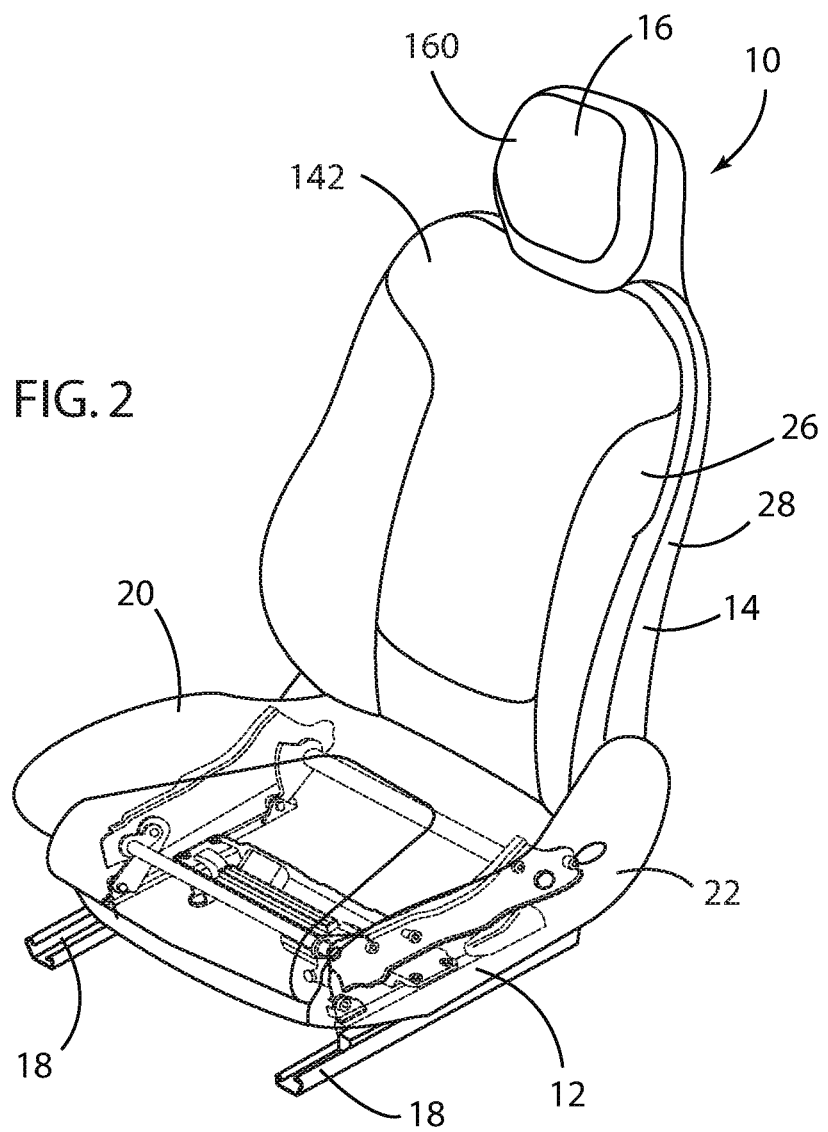
FIG. 2 is a front side perspective view of the motor vehicle seating assembly of FIG. 1 according to the present disclosure.

Referring to FIGS. 1 and 2, reference numeral 10 generally designates a motor vehicle seating assembly for a motor vehicle 8 having a lower seat assembly 12 and an upwardly extending seat back assembly 14. The seat back assembly 14 preferably supports a head restraint 16 thereon. The upwardly extending seat back assembly 14 is pivotally coupled with the lower seat assembly 12, such that the upwardly extending seat back assembly 14 can be moved between upright and inclined positions relative the lower seat assembly 12. The head restraint 16 is operably, and preferably slidably, connected with the seat back assembly 14 and also positioned in a variety of positions and heights relative to the upwardly extending seat back assembly 14 to support the head and neck of a driver or a passenger.

Figure 3:
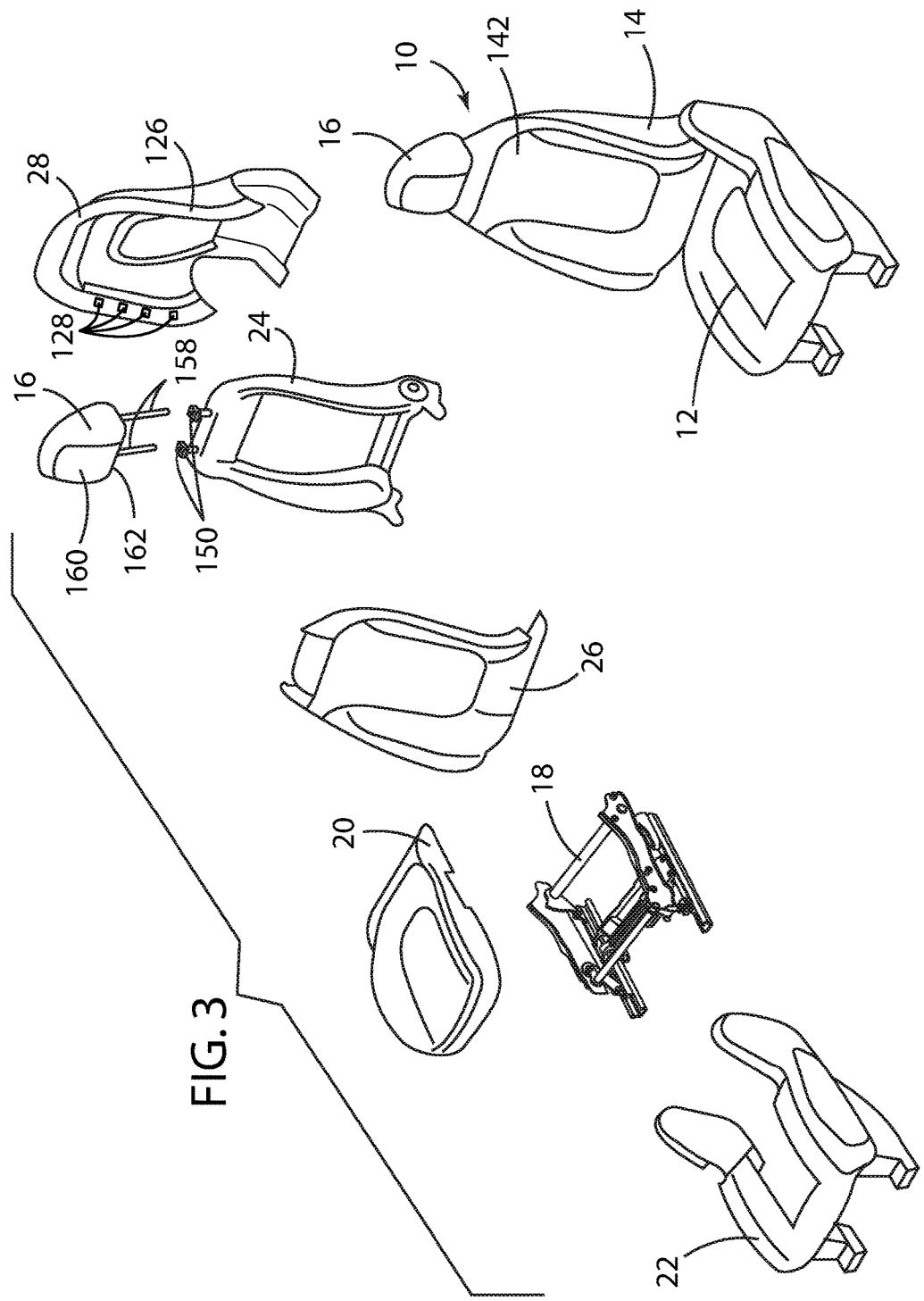
FIG. 3 is an exploded front side perspective view of the motor vehicle seating assembly of FIG. 1 according to the present disclosure.

Referring to FIG. 3, the lower seat assembly 12 includes a lower seat frame base 18 to which a lower seat cushion and suspension module 20 is attached. A decorative plastic fascia 22 is mounted to the lower seat assembly 12 and about the seat cushion and suspension module 20. The upwardly extending seat back assembly 14 includes a seat back frame 24, an upper seat back and suspension module 26, a decorative seat back rear panel module 28, and the head restraint 16, as further discussed herein.

It is best shown in FIG. 4, the seat back and suspension module 26 includes a one-piece composite inner carrier substrate 30 and a suspension system 32 mounted to and supported by the one-piece composite inner carrier substrate 30. As shown in FIGS. 10-12, the one-piece composite inner carrier substrate 30 is preferably formed as an integrated and unitary structure via an injection molding process from a rigid plastic material containing reinforcing fibers, such as fiber glass fibers. The one-piece composite inner carrier substrate 30 is generally comprised of a pair of vertically extending side members 34, an upper transverse member 36, and a lower transverse member 38. A generally rectangular opening 40 is defined by the vertically extending side members 34, the upper transverse member 36, and the lower transverse member 38.

The result is an outer perimeter 42 extending about an outer edge 44 of the vertically extending side members, an outer edge 46 of the upper transverse member 36, and an outer edge 48 of the lower transverse member 38. Also, an inner perimeter 50 defining the generally rectangular opening 40 is created by an inner edge 52 of the vertically extending side members 34, an inner edge 54 of the upper transverse member 36, and an inner edge 56 of the lower transverse member 38. A plurality of attachment openings 58 is disposed about the outer perimeter 42 of the one-piece composite inner carrier substrate 30.

The one-piece composite inner carrier substrate 30 of the seat back and suspension module 26 forms a support structure to which a seat back trim cover 60 may be attached, as shown in FIGS. 6-9. The seat back trim cover 60 can be formed of any material typically applied to such applications, such as leather, vinyl, cloth, or any combination thereof. The seat back and suspension module 26 further comprises a cushion foam layer 62 concealed beneath and in juxtaposed relation with seat back trim cover 60. The seat back trim cover 60 has an outer perimeter 64 that is slightly larger than the outer perimeter 42 of the one-piece composite inner carrier substrate 30 of the seat back and suspension module 26, which allows the outer perimeter 64 of the seat back trim cover 60 to be folded over the outer perimeter 42 of the one-piece composite inner carrier substrate 30, as discussed further below.

A plurality of seat back trim cover attachment fasteners 66, each preferably comprising a J-retainer, are provided about the outer perimeter 64 of the seat back trim cover 60, as best shown in FIG. 8A. As a beneficial feature of the present disclosure, the J-retainer attachment fasteners 66 are located at strategic locations about the outer perimeter 64 of the seat back trim cover 60. The J-retainer attachment fasteners 66 are also preferably selected of a particular size from among a plurality of J-retainer attachment fastener 66 sizes that corresponds to the tension applied to the position about the outer perimeter 64 of the seat back trim cover 60. That is, when installed on the one-piece composite inner carrier substrate 30 as described herein, the seat back trim cover 60 experiences a different tension at different locations about its outer perimeter 64 when occupied by a seated occupant. In those locations that experience a higher tension, it is therefore advantageous that a larger J-retainer attachment fastener 66 be selected to provide a more robust attachment of the seat back trim cover 60 to the one-piece composite inner carrier substrate 30. The attachment openings 58 disposed about and proximate to the outer perimeter 42 of the one-piece composite inner carrier substrate 30 are preferably sized to receive the corresponding J-retainer attachment fastener 66 in the one-piece composite inner carrier substrate 30 at a particular location.

The J-retainer attachment fasteners 66, as are well known in the art, each comprise a plastic clip having a main portion 70 and a hook 72 provided at a distal end 74 of the main portion 70. The hook 72 preferably has a U-shaped configuration with an engaging portion 76 extending in parallel with the main portion 70. An inwardly extending gripping barb 78 is preferably provided at a distal end 80 of the engaging portion 76 that resiliently and detachably engages an edge 82 of the perimeter trim J-retainer attachment openings 58, as shown in FIG. 8A. Preferably, the plastic from which the J-retainer attachment fasteners 66 are constructed is a non-breakable material, such as polypropylene. The main portion 70 of the J-retainer attachment fasteners 66 is further preferably sewn directly to the outer perimeter 64 of the seat back trim cover 60, which when attached to a perimeter trim J-retainer attachment opening 58 about the outer perimeter 42 of the one-piece composite inner carrier substrate 30, keeps the seat back trim cover 60 tight against the one-piece composite inner carrier substrate 30.

During assembly of the seat back and suspension module 20, the seat back trim cover 60, with an exposed surface 84 facing forwardly relative the one-piece composite inner carrier substrate 30, is placed with the cushion foam layer 62 disposed beneath it against a forward surface 86 of the one-piece composite inner carrier substrate 30 and the suspension system 32 mounted to and supported by the one-piece composite inner carrier substrate 30. The outer perimeter 64 of the seat back trim cover 60, with the J-retainer attachment fasteners 66 installed at locations about its perimeter 64 corresponding to the discrete locations of the perimeter trim J-retainer attachment openings 58, is folded over the outer perimeter 42 of the one-piece composite inner carrier substrate 30. The J-retainer attachment fasteners 66 are then inserted into and received by the perimeter trim J-retainer attachment openings 58 to attach the seat back trim cover 60 at discrete points around the outer perimeter 42 of the one-piece composite inner carrier substrate 30 to maintain the seat back trim cover 60 in a taunt condition.

Figure 9:
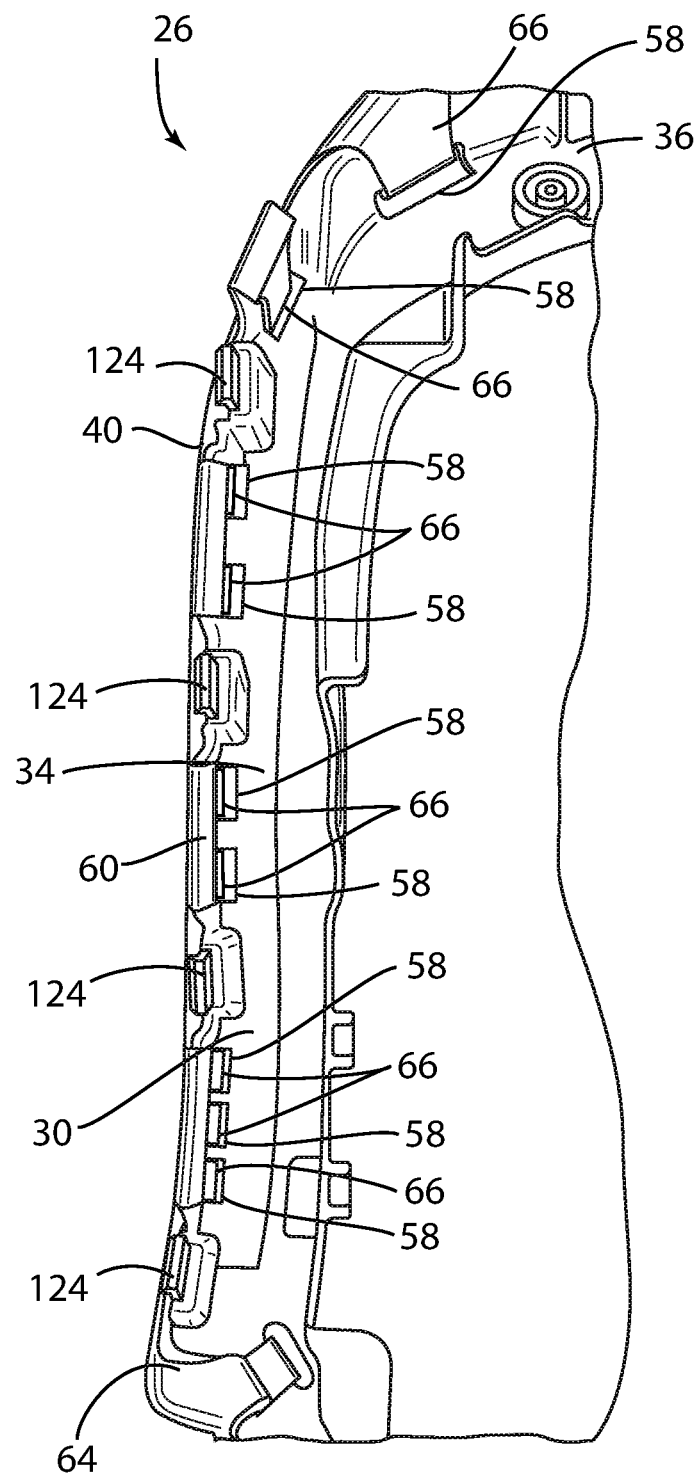
FIG. 9 is a rear perspective view of a side portion of the seat back and suspension module of the motor vehicle seating assembly of FIG. 1 according to the present disclosure.

As shown in FIGS. 6-12, preferably, each of the perimeter trim J-retainer attachment openings 58 disposed on the vertically extending side members 34 of the one-piece composite inner carrier substrate 30 have a plurality of opening widths that correspond to the size of the J-retainer attachment fastener 66 selected for and applied to that location about the outer perimeter 64 of the seat back trim cover 60. However, the width of the perimeter trim J-retainer attachment openings 58 can be sized to meet the need of the seat back trim cover 60 at any position about the outer perimeter 42 of the one-piece composite inner carrier substrate 30. A lower portion 88 of the seat back trim cover 60 is preferably attached to the lower transverse member 38 of the outer perimeter 42 of the one-piece composite inner carrier substrate 30 via a transversely extending integrated comb 90 of J-retainer attachment fasteners 66 received within a transversely extending and corresponding plurality of attachment openings 58 disposed along the lower transverse member 38 of the one-piece composite inner carrier substrate 30, as best shown in FIGS. 8 and 9.

As a result of the use of the J-retainer attachment fasteners 66 and perimeter trim J-retainer attachment openings 58 strategically disposed about the outer perimeter 42 of the one-piece composite inner carrier substrate 30, the seat back trim cover 60 can be easily and readily attached about the outer perimeter 42 of the one-piece composite inner carrier substrate 30. The perimeter trim J-retainer attachment openings 58 disposed about the outer perimeter 42 of the one-piece composite inner carrier substrate 30 thus allows for the seat back trim cover 60 to be attached at all critical points around the seat back and suspension module 26 from top to bottom to ensure that the seat back trim cover 60 remains taut and maintains a crafted appearance even as the occupant ingresses and egresses the motor vehicle seating assembly 10. Additionally, the perimeter trim J-retainer attachment openings 58 are purposely located to allow ease of attachment, low assembly efforts, and faster assembly times.

The decorative seat back rear panel module 28 represents a further innovation. In the past, most decorative back panels were typically constructed as a one-piece molded component, some of which were vinyl-wrapped. However, this approach tended to limit the ability to deliver unique styling and contrasting materials and surface finishes. In addition, a modular design and assembly concept offers reduced costs and can provide for the inclusion of additional components, such as airbag deployments, within the motor vehicle seating assembly 10.

Figure 14:
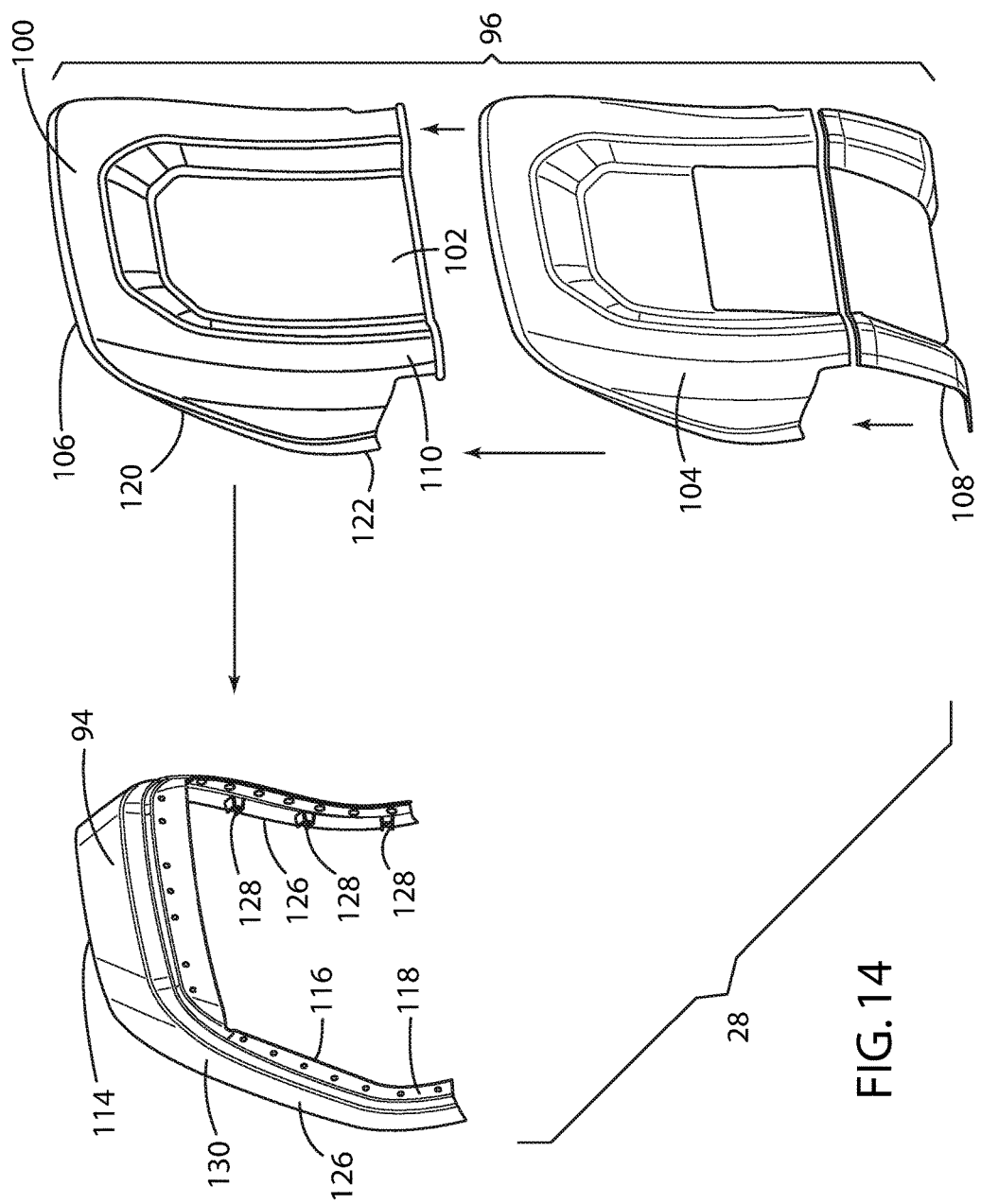
FIG. 14 is a rear side perspective exploded view of the decorative seat back rear panel module of the motor vehicle seating assembly of FIG. 1 according to the present disclosure.

Accordingly, the decorative seat back rear panel module 28 of the present disclosure comprises a first seat back rear perimeter panel 94 and a second seat back rear central panel 96 that is operably connected with the first seat back rear perimeter panel 94 and that together define a rear exterior surface area 98 of the decorative seat back rear panel module 28. The second seat back rear central panel 96 in turn comprises a molded substrate 100 having a rearward facing outer surface 102 and a trim covering 104 disposed against and attached to the outer surface 102 of the molded substrate 100. As best shown in FIGS. 13 and 14, the molded substrate 100 further comprises an outer perimeter 106, where the trim covering 104 is folded over the outer perimeter 106 of the molded substrate 100. Preferably, the trim covering 104 is attached to the molded substrate 100 at all areas of contact via a thin layer of adhesive to provide a smooth, wrinkle free, surface. Additionally, as noted above, the trim covering 104 can be fabricated from any of the usual materials used for trim coverings for motor vehicle seating assemblies, such as leather, vinyl, cloth, and combinations thereof. Preferably, the second seat back rear central panel 96 also receives a toe kick trim panel 108 depending from a lower portion 110 of the second seat back rear central panel 96.

The first seat back rear perimeter panel 94 is preferably injection molded from a semi-rigid plastic material. As a decorative component, the exposed rear exterior surface area 98 of the first seat back rear perimeter panel 94 represents an A-surface within the interior of the motor vehicle 8 and is preferably finished with a high grade, textured, grained surface to simulate leather or another predetermined surface finish.

As shown in FIG. 14, the first seat back rear perimeter panel 94 comprises a smaller portion of the rear exterior surface area 98 of the decorative seat back rear panel module 28 and the second seat back rear central panel 96 comprises a larger portion of the rear exterior surface area 98 of the decorative seat back rear panel module 28. Preferably, the first seat back rear perimeter panel 94 comprises about 30% of the rear exterior surface area 98 of the decorative seat back rear panel module 28 and the second seat back rear central panel 96 comprises a about 70% of the rear exterior surface area 98 of the decorative seat back rear panel module 28. This ratio between the portions of the rear exterior surface area 98 of the first seat back rear perimeter panel 94 relative the second seat back rear central panel 96 is believed to provide heretofore unattained flexibility in design and styling, in that interchangeable, second seat back rear central panel 96, each having different features and different coverings, can be readily interchanged to provide a wide range of differing motor vehicle seating assembly designs. For example, as shown in FIG. 13, the trim covering 104 for the second seat back rear central panel 96 may comprise a sewn cloth wrap having a sewn-in map pocket 112. Alternatively, beverage holders and closable compartments (not shown) might be incorporated within the second seat back rear central panel 96 and then merely attached to the first seat back rear perimeter panel 94 for subsequent assembly into the motor vehicle seating assembly 10 for a particular vehicle build, without having to adopt the same second seat back rear central panel 96 for every motor vehicle seating assembly 10 installed in a particular motor vehicle line.

For ease of assembly, the first seat back rear perimeter panel 94 has an outer perimeter 114 defining the outer perimeter of the decorative seat back rear panel module 28 and an inner perimeter 116 having a first mounting flange 118. The second seat back rear central panel 96 has a complementary outer perimeter 120 having a second mounting flange 122 overlapping with and attached to the first mounting flange 118 of the inner perimeter 116 of the first seat back rear perimeter panel 94. The second mounting flange 122 of the second seat back rear central panel 96 is preferably heat-staked to the first mounting flange 118 of the first seat back rear perimeter panel 94. Alternatively, the second mounting flange 122 of the second seat back rear central panel 96 may be vibration welded to the first mounting flange 118 of the first seat back rear perimeter panel 94.

With regard to assembly of the upwardly extending seat back assembly 14, as noted above, the one-piece composite inner carrier substrate 30 has a pair of vertically extending side members 34. The outer edge 44 of each of the vertically extending side members 34 of the one-piece composite inner carrier substrate 30 preferably includes a plurality of vertically aligned, molded-in attachment fasteners 124, preferably snap fit fasteners as best shown in FIGS. 10-11. The first seat back rear perimeter panel 94 of the decorative seat back rear panel module 28, shown in FIG. 14, is likewise provided with a pair of vertically extending, forward facing, and opposed side edges 126 that each similarly include a plurality of complementary vertically aligned, molded-in attachment receptacles 128 that correspond to, are in alignment with, and receive the vertically aligned, molded-in attachment fasteners 124 of the one-piece composite inner carrier substrate 30. With the vertically aligned, molded-in attachment fasteners 124 of the one-piece composite inner carrier substrate 30 aligned and corresponding with the molded-in attachment receptacles 128 of the decorative seat back rear panel module 28, the molded-in attachment fasteners 124 of the one-piece composite inner carrier substrate 30 are resiliently secured by the molded-in attachment receptacles 128 of the decorative seat back rear panel module 28 when the seat back and suspension module 26 is assembled to the seat back frame 24. Preferably, the perimeter J-retainer attachment fasteners 66 disposed on the vertically extending side members 34 of the one-piece composite inner carrier substrate 30 alternate with the vertically aligned, molded-in attachment fasteners 124 disposed on the one-piece composite inner carrier substrate 30.

Additionally, the side edges 126 of the first seat back rear perimeter panel 94 of the decorative seat back rear panel module 28 are preferably configured to extend forwardly to form a trim panel 130 that abuts the resulting folded over perimeter 64 of the seat back trim cover 60 to form an aesthetically pleasing and finished appearance when attached with the one-piece composite inner carrier substrate 30.

Preferably, the one-piece composite inner carrier substrate supports the suspension system 32 within the generally rectangular opening 40 to resiliently support the weight of an occupant sitting in the motor vehicle seating assembly 10. The suspension system 32 generally comprises a first set of metal, preferably spring steel, wires 132 having a nominal wire thickness that extend transversely between a second set of metal wires 134 that extend vertically between the vertically extending side member 34, as best shown in FIGS. 11-12. A pair of transversely extending wires 136 operably connects the second set of metal wires 134 to each of the vertically extending side members 34 of the one-piece composite inner carrier substrate 30.

One of the pair of transversely extending wires 136 may be attached to each of the vertically extending side members 34 of the one-piece composite inner carrier substrate 30 via a load cell 138 mounted within a cavity 140 formed along the inner edge 52 of each of the vertically extending side members 34 of the one-piece composite inner carrier substrate 30, as shown in FIG. 11. The result is a suspension system 32 that has a spring web situated within the generally rectangular opening 40 and which provides resilient support against the weight of the occupant in a motor vehicle seating assembly 10. Further, in the event of a rear impact event, the inertia of an occupant seating in the motor vehicle seating assembly 10 pushes back against the upwardly extending seat back assembly 14 and creates tension in the suspension system 32. Optionally, the load cell 138 operably connected to the suspension system 32 may be situated to detect this event and transmit an appropriate signal to a motor vehicle controller (not shown).

Thus, an additional benefit of the one-piece composite inner carrier substrate 30 and decorative seat back rear panel module 28 of the present disclosure is that they may be readily provided with additional features or structures by changing the molds for the one-piece composite inner carrier substrate 30 or decorative seat back rear panel module 28. For example, one or more of the vertically extending side members 34 of the one-piece composite inner carrier substrate 30 can be modified and adapted to accept a housing or other mounting structure for a side airbag assembly mounted in the motor vehicle seating assembly 10 (not shown). Similarly, the pair of vertically extending, forward facing, and opposed side edges 126 of the first seat back rear perimeter panel 94 can be configured to include an integrated side airbag mounting chamber (not shown).

A further innovation of the present disclosure is the manner in which the one-piece composite inner carrier substrate 30 of the seat back and suspension module 20 is coupled to the seat back frame 24. In the past, assuring the structural integrity of the upper portion 142 of the vertically extending seat back assembly 14 has been an important design consideration. In accordance with the present disclosure, head restraint guide sleeves 150 are employed as structural members to mechanically lock the one-piece composite inner carrier substrate 30 of the seat back and suspension module 26 to the seat back frame 24. The head restraint guide sleeves 150 are pushed through aligned openings 152, 154 in each of the one-piece composite inner carrier substrate 30 and the seat back frame 24, respectively, during final seat assembly until fully seated and locked in place. Once installed, the head restraint guide sleeves 150 operate in their usual manner and form guide sleeve cavities 156 within which the head restraint mounting posts 158 of the head restraint 16 can be vertically adjusted. This innovation contributes to the modular design disclosed herein, and provides an assembly concept that offers reduced costs and can provide improved design flexibility.

Figure 15:
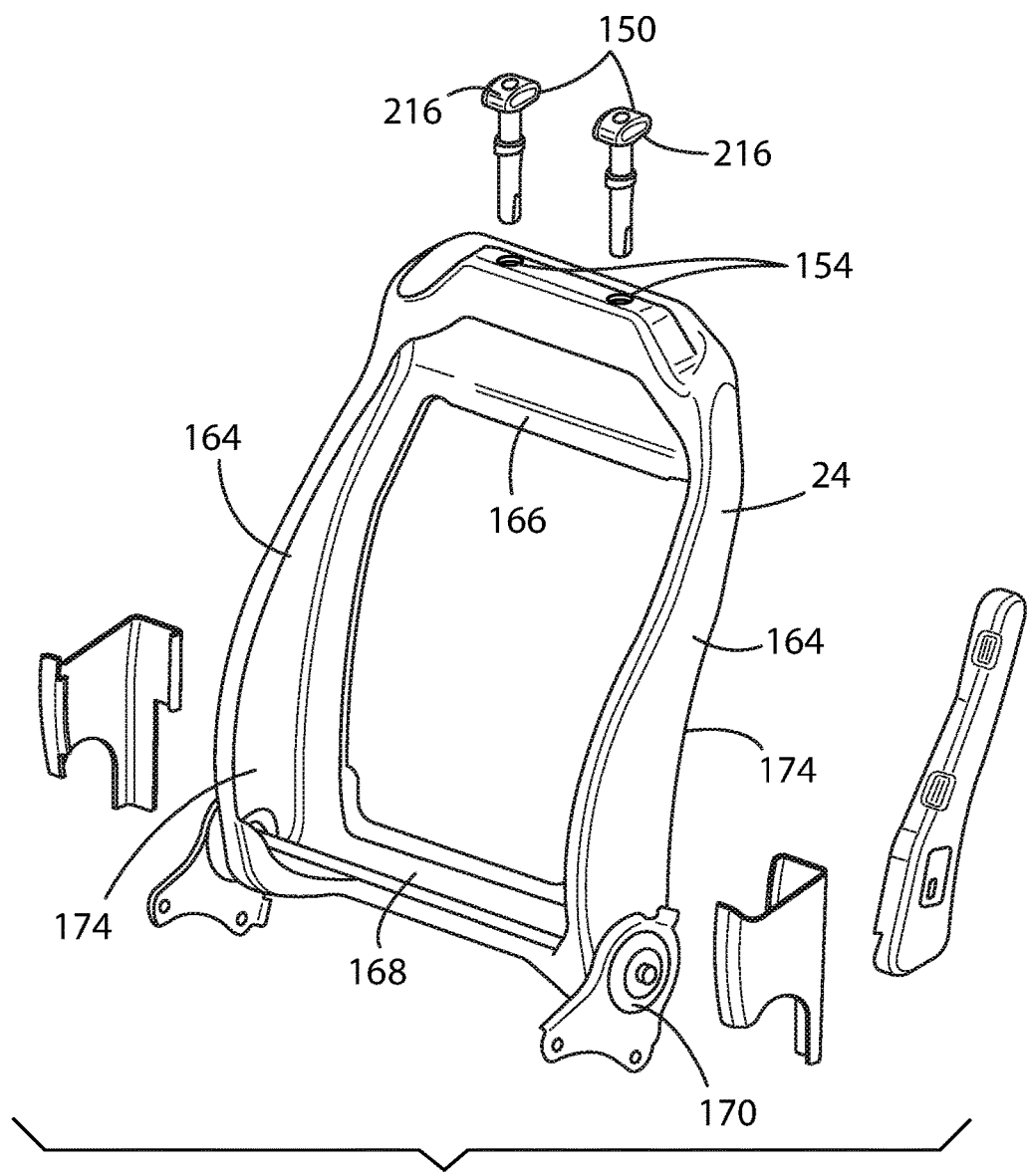
FIG. 15 is a front perspective view of the seat back frame of the motor vehicle seating assembly of FIG. 1 according to the present disclosure.

As shown in FIG. 3, the head restraint 16 is rather conventional and consists of a head restraint pad 160 and a pair of head restraint mounting posts 158 depending from a lower surface 162 in the head restraint pad 160. As shown in FIG. 15, the seat back frame 24 is the main structural member of the upwardly extending seat back assembly 14 and is comprised of a pair of vertically extending side members 164, an upper transverse member 166 forming an upper portion thereof, and a lower transverse member 168. An optional pivot assembly 170 rotationally couples the seat back frame 24 and the upwardly extending seat back assembly 14 to the lower seat base frame. The seat back frame 24 thus forms a forwardly facing surface 172 and a rearwardly facing surface 174 and is provided with a pair of vertically oriented frame openings 154 within the upper transverse member 166 forming the upper portion thereof. Similarly, the upper transverse member 36 of the one-piece composite inner carrier substrate 30 forming the upper portion of the seat back and suspension module 26 is provided with a pair of vertically oriented module openings 152 in the upper portion. The module openings 152 and frame openings 154 are disposed in vertical alignment, one with the other.

The pair of head restraint guide sleeves 150 are vertically received and retained within the module openings 152 and frame openings 154, wherein the head restraint mounting posts 158 are received and adjustably retained within the head restraint guide sleeves 150, as shown in FIGS. 15-20. As further described below, the head restraint guide sleeves 150 are received and retained within the module opening 152 and frame openings 154 of the upper transverse member 36 of the one-piece composite inner carrier substrate 30 and the upper transverse member 166 of the seat back frame 24, respectively, to mechanically lock the one-piece composite inner carrier substrate 30 to the seat back frame 24.

Vertically oriented openings 148 through each of an upper portion of the seat back trim cover 60 and an upper portion of the cushion foam layer 62 that overlay the upper portion 142 of the upwardly extending seat back assembly 14. Thus, the head restraint guide sleeves 150 pass through the upper portion of the seat back and suspension module 26, which includes the upper portion of the seat back trim cover 60, the upper portion of the cushion foam layer 62, and the upper transverse member 36 of the upper portion of the one-piece composite inner carrier substrate 30, and into the upper transverse member 166 of the seat back frame, which receives and locks the head restraint guide sleeve 150 in place subsequent assembly of the upwardly extending seat back assembly 14. As an injection molded component, the module openings 152 within the upper transverse member of the one-piece composite inner carrier substrate 30 are molded-in to receive the head restraint guide sleeves 150 and lock the head restraint guide sleeves 150 to the upper transverse member 36 of the one-piece composite inner carrier substrate 30 to the upper transverse member 166 of the seat back frame 24.

Figure 16:
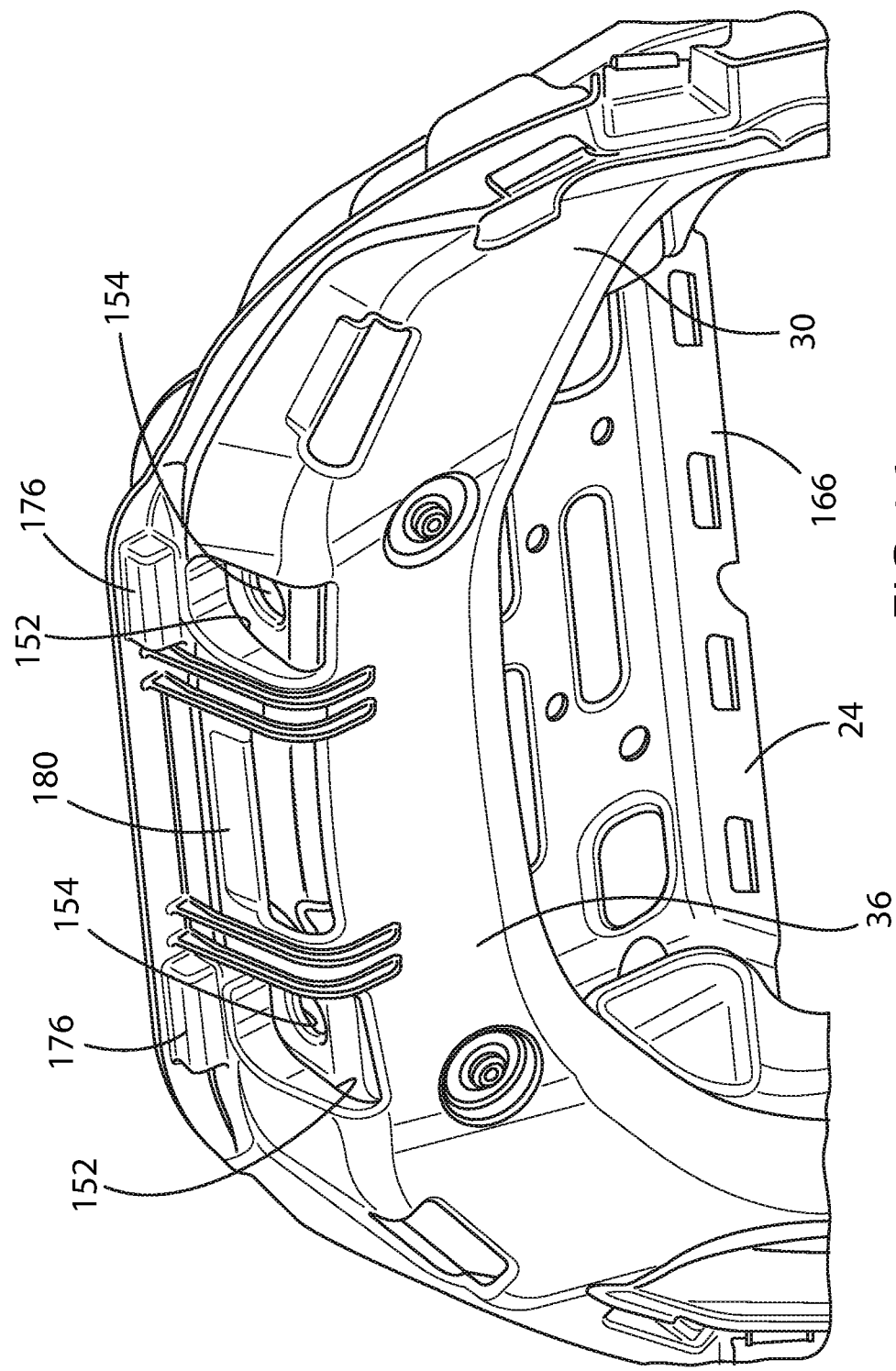
FIG. 16 is a front perspective view of the upper portion of the one-piece composite inner carrier substrate and the upper portion of the seat back frame of the motor vehicle seating assembly of FIG. 1 according to the present disclosure.
Figure 17:
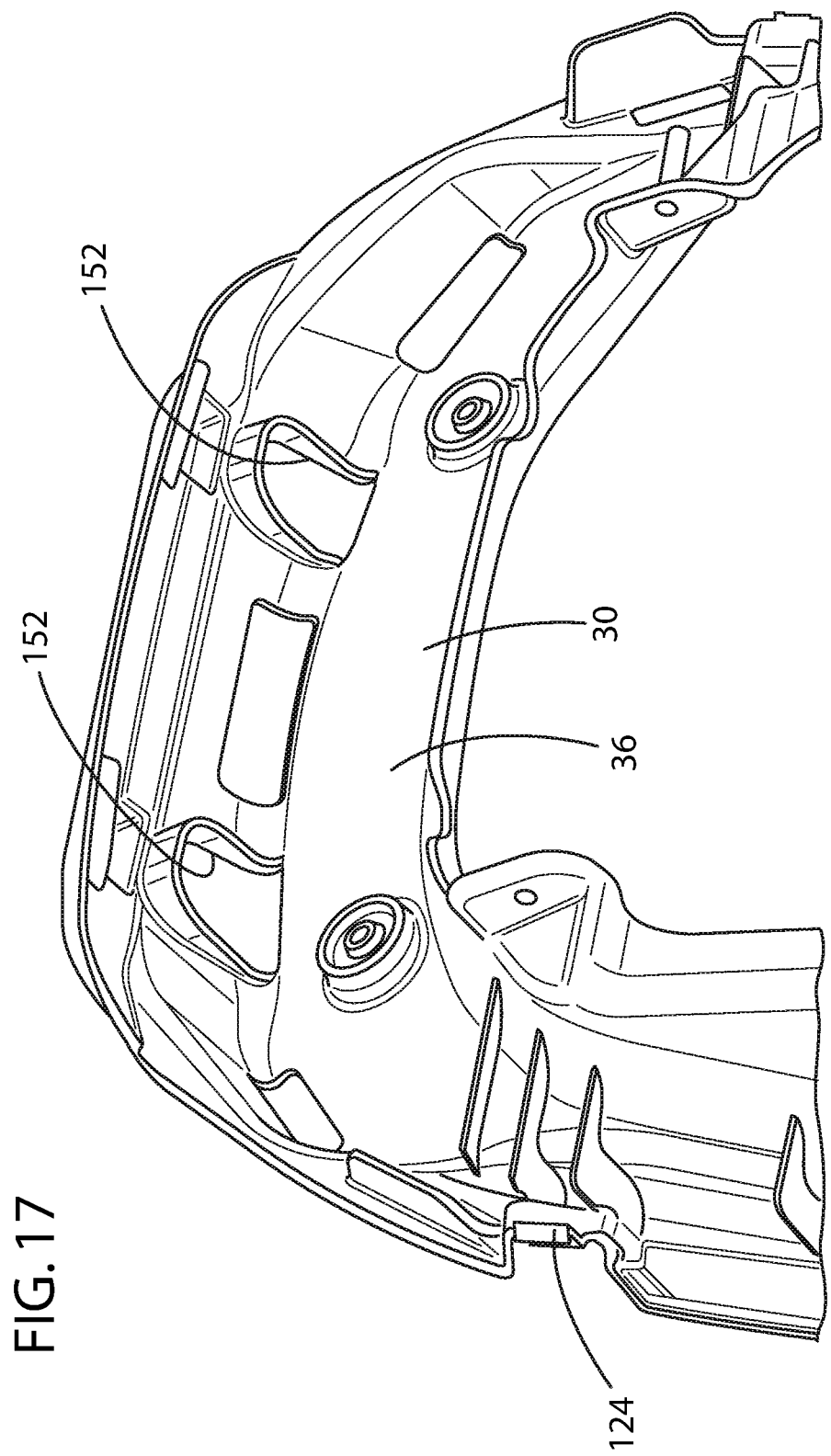
FIG. 17 is a rear perspective view of the upper portion of the one-piece composite inner carrier substrate of the motor vehicle seating assembly of FIG. 1 according to the present disclosure.
Figure 18:
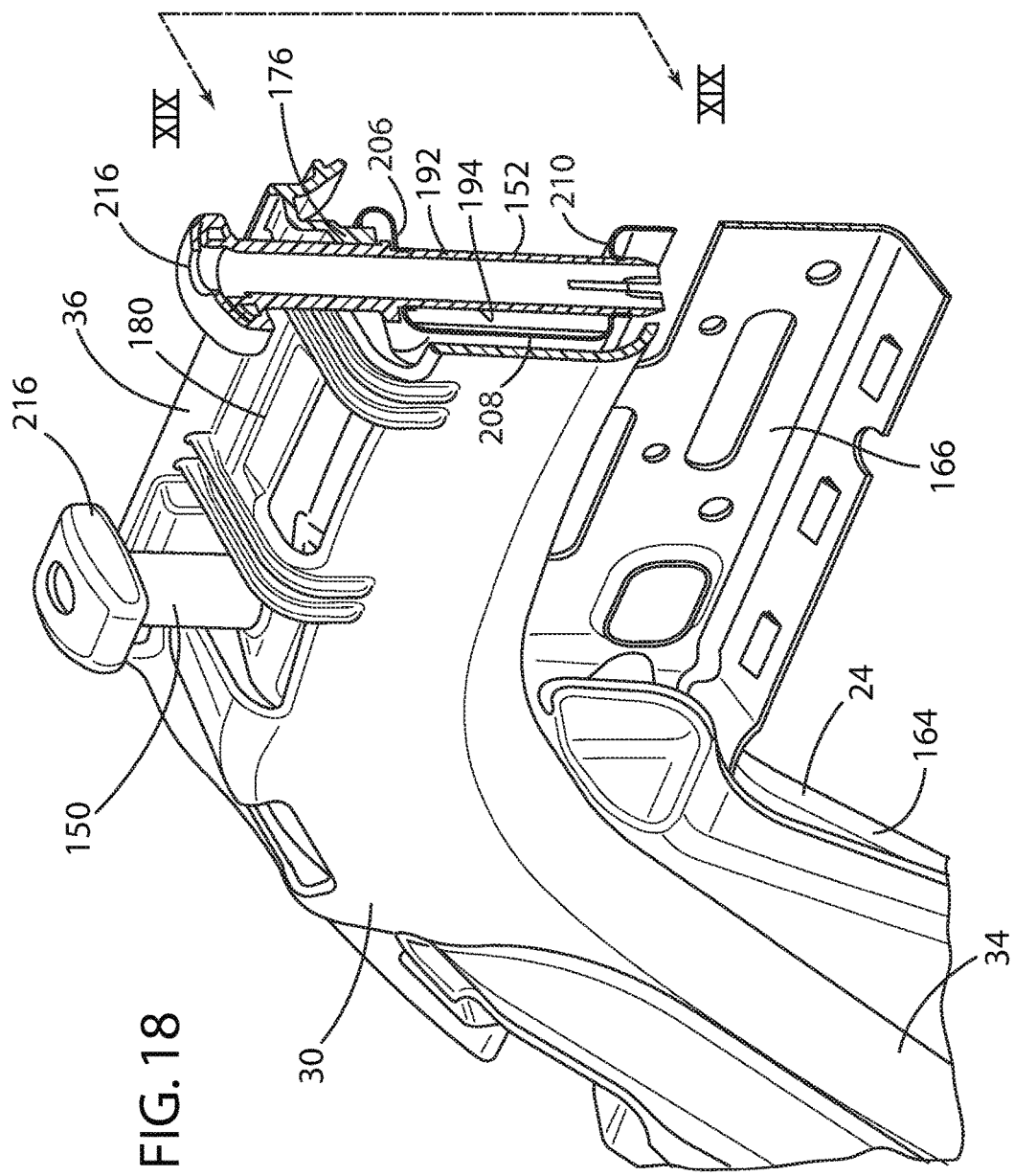
FIG. 18 is a perspective side cross-sectional view of the upper portion of the one-piece composite inner carrier substrate and the upper portion of the seat back frame of the motor vehicle seating assembly of FIG. 1 according to the present disclosure.

To this end, the upper transverse member 36 of the one-piece composite inner carrier substrate 30 also includes a pair of molded-in integral resilient locking pawls 176, preferably disposed at a peripheral position proximate a rear edge 178 of the molded-in module openings 152, as shown in FIG. 16. Each of the resilient locking pawls 176 is disposed adjacent to and extends toward each of the aligned module openings 152 in the one-piece composite inner carrier substrate 30. Each of the resilient locking pawls 176 also extends upwardly relative an upper surface 180 of the upper transverse member 36 of the one-piece composite inner carrier substrate 30 in a cantilevered fashion and are displaceable between a released position and an engaged position, as discussed further below. Further, each of the resilient locking pawls 176 has an inwardly inclined upper surface 182, a flat vertical face 184, and a lower edge 186. The forward and side edges 188, 190 of the molded-in module openings 152 do not necessarily need to be circular and can be oversized relative the frame openings 154 in the upper transverse member 166 of the seat back frame 24. Most important is that the downwardly extending head restraint mounting posts 158 of the head restraint 16 pass readily through the molded-in module openings 152 in the upper transverse member 36 of the one-piece composite inner carrier substrate 30. The head restraint guide sleeves 150 are instead rigidly and fixedly retained in position via the frame openings 154 in the upper transverse member 166 of the seat back frame 24, as discussed below.

Figure 19:
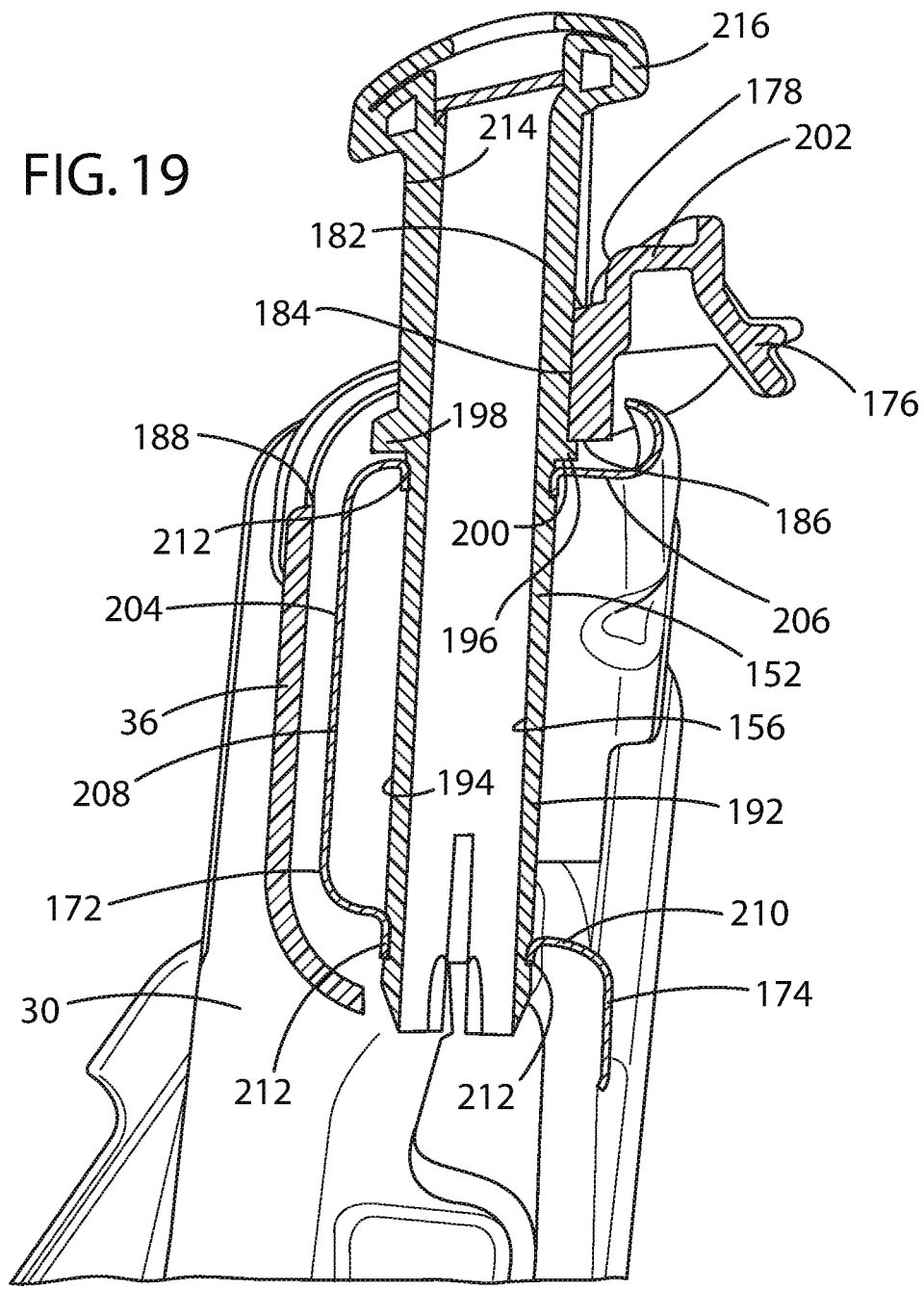
FIG. 19 is a side cross-sectional view taken along the line XIX-XIX in FIG. 18 of the upper portion of the one-piece composite inner carrier substrate and the upper portion of the seat back frame of the motor vehicle seating assembly of FIG. 1 according to the present disclosure.
Figure 20:
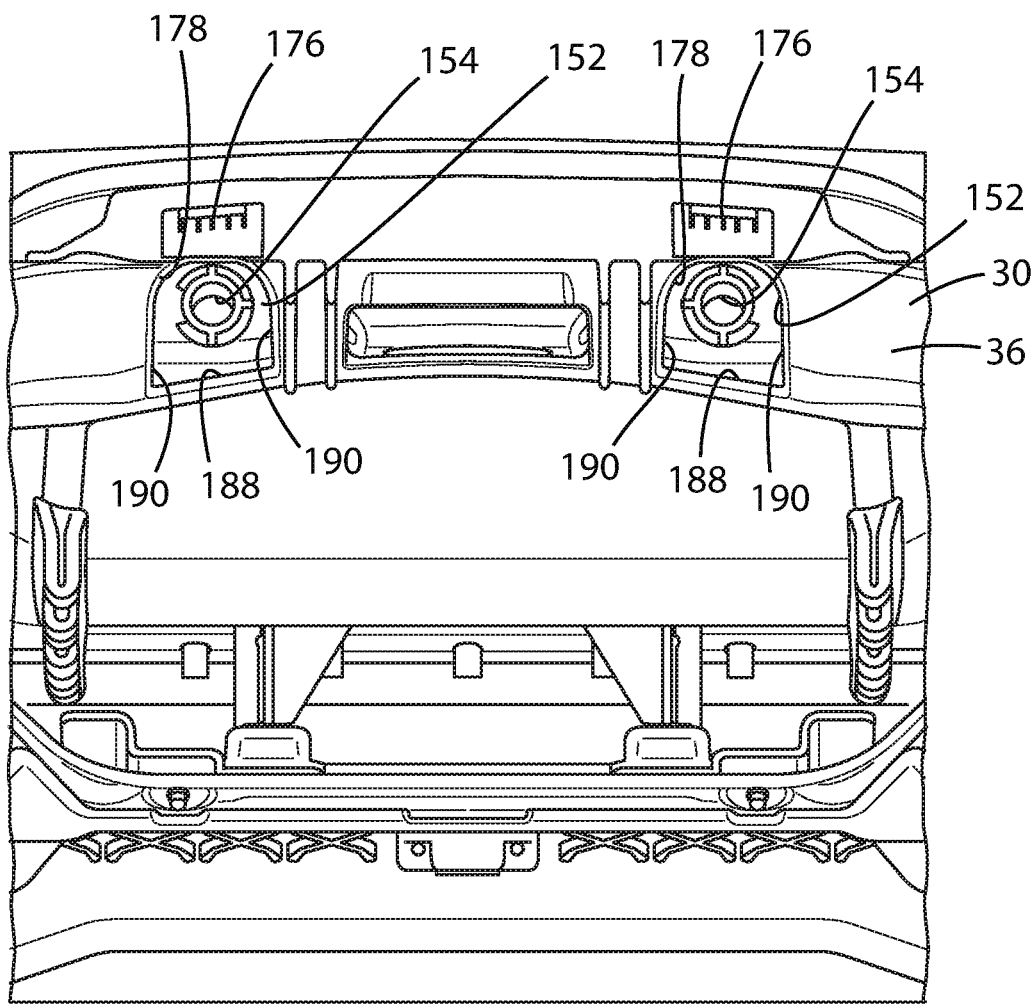
FIG. 20 is a perspective top view of the upper portion of the one-piece composite inner carrier substrate and the upper portion of the seat back frame of the motor vehicle seating assembly of FIG. 1 according to the present disclosure.

As best shown in FIG. 19, the pair of head restraint guide sleeves 150 each comprises a tubular member 92 having an outer cylindrical surface 194 and the guide sleeve cavity 156 within which the mounting posts 158 of the head restraint 16 are received and restrained. The outer cylindrical surface 194 of each of the head restraint guide sleeves 150 has a locking tab 196. The outer cylindrical surface 194 of the head restraint guide sleeve 150 also include a stop 198 that engages the frame opening 154 of the upper transverse member 166 of the upper portion 142 of the seat back frame 24 when the head restraint guide sleeve 150 is fully inserted.

As each of the head restraint guide sleeves 150 is inserted after the assembled seat back, and suspension module 26 has been assembled with the decorative seat back rear panel module 28, as described above, the outer cylindrical surface 194 of the head restraint guide sleeve 150 is received within an aligned opening 148 in the seat back trim cover 60 and the cushion foam layer 62, then module opening 152 of the upper transverse member 36 of the one-piece composite inner carrier substrate 30, and the frame openings 154 in the upper transverse member 166 of the seat back frame 24. As it is inserted, the locking tab 196 of the head restraint guide sleeve 150 acts against the inwardly inclined upper surface 182 of the resilient locking pawl 176 and resiliently displaces the resilient locking pawl 176 away from the module opening 152 to the released position until the locking tab 196 moves downward relative to and clears the flat vertical face 184. With the head restraint guide sleeve 150 fully inserted against the stop 198, the lower edge 186 of the resilient locking pawl 176 moves to the engaged position and mechanically engages an upper surface 200 of the locking tab 196 to prevent withdraw of the head restraint guide sleeve 150 from the module opening 152 in the upper transverse member 36 of the one-piece composite inner carrier substrate 30. If it is desired to remove the head restraint guide sleeve 150, an upper portion 202 of the resilient locking pawl 176 can be manually displaced to the released position, wherein the lower edge 186 of the resilient locking pawl 176 disengages the upper surface 200 of the locking tab 196 and the head restraint guide sleeve 150 can be removed.

The two head restraint guide sleeves 150, when pushed through the molded-in module openings 152 in the upper transverse member 36 of the one-piece composite inner carrier substrate 30 during the final seat assembly and fully seated, act as "mechanical locks" for the one-piece composite inner carrier substrate 30 to the seat back frame 24. The benefit of the "locks" helps prevent the one-piece composite inner carrier substrate 30 from listing forward during dynamic events and remain "locked" to the seat back frame 24 until manually released.

Preferably, the upper transverse member 36 of the seat back frame 24 comprises a U-shaped beam 204 having an upper horizontal flange 206, a vertical center portion 208, and a lower horizontal flange 210, which adds structural support to the seat back frame 24. Each of the upper horizontal flange 206 and lower horizontal flange 210 has vertically aligned frame openings 154 within which the outer cylindrical surface 194 of the head restraint guide sleeve 150 is fittingly received. Preferably, each of these frame openings 154 has a downwardly curved and flared edge 212 to facilitate insertion of the head restraint guide sleeve 150, as shown in FIG. 19. The upper and lower horizontal flanges 206, 210 also provide a mechanical attachment that creates a "line-to-line" contact to ensure that the head restraint guide sleeves 150 do not tilt or move in a longitudinal or lateral direction when installed and provides a pass-through feature for the head restraint guide sleeves 150.

Preferably, an upper portion 214 of the head restraint guide sleeves 150 comprises a trim cover bezel 216, shown in FIGS. 15 and 19. As noted above, the outer cylindrical surface 194 of the head restraint guide sleeve 150 also includes a stop 198 that engages the frame opening 154 on the upper horizontal flange 206 of the upper transverse member 166 of the seat back frame 24 when the head restraint guide sleeve 150 is fully inserted. Preferably, the stop 198 is disposed opposite the locking tab 196 on the outer cylindrical surface 194 of the head restraint guide sleeve 150 and below the trim cover bezel 216 by a distance corresponding to an overall thickness of the seat back trim cover 60 and cushion foam layer 62 disposed beneath the seat back trim cover 60 on the seat back and suspension module 26. Thus, when assembled, the trim cover bezel 216 conceals the openings 148 in the seat back trim cover 60 and provides an aesthetically presentable appearance.

As described above, the seat back and suspension module 26 and seat back frame 24 of the present disclosure provides integrated modular assembly features and supports JIT assembly practices by modularizing the seat back and suspension module 26 into a single module and therefore reduce the costs of final assembly by allowing this assembly to be sourced to a location independent of the traditional JIT assembly plant. The described seat back and suspension module 26 uses a one-piece composite inner carrier substrate 30 that enables the seat back trim cover 60 to be fully assembled and attached around the outer perimeter 42 of the one-piece composite inner carrier substrate 30 to provide a crafted, easier to assemble, and more cost- and time-efficient product for upwardly extending seat back assembly 14.

In order to modularize the upwardly extending seat back assembly 14 and to therefore reduce the costs of final assembly by requiring less trim assembly time and difficulty that accompanying seat trim "stuffing," as well as the option of allowing this assembly to be sourced to a location independent of the traditional JIT assembly plant, the disclosed one-piece composite inner carrier substrate 30 can be employed. Further, the cushion foam layer 62 disposed beneath the seat back trim cover 60 can reduced, resulting in the use of less material and a lighter weight for the upwardly extending seat back assembly 14. Also, the use of strategically located trim cover attachment openings 58 and J-retainer attachment fasteners 66 about virtually the entire outer perimeter 42 of the one-piece composite inner carrier substrate 30 and seat back trim cover 60 allows ease of attachment, low assembly efforts, and good retention for craftsmanship. The use of head restraint guide sleeves 150 that are received and retained within module opening 152 and frame openings 154 of the upper transverse member 36 of the one-piece composite inner carrier substrate 30 and the upper transverse member 166 of the seat back frame 24, respectively, provide a ready and reliable mechanical lock between the one-piece composite inner carrier substrate 30 to the seat back frame 24. The one-piece composite inner carrier substrate 30 advantageously employs compounding technology to achieve a high strength composite structure, while integrating several benefits and features into a low cost and robust design and achieving a new look for styling.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A motor vehicle seating assembly for a motor vehicle having a lower seat assembly and an upwardly extending seat back assembly, the upwardly extending seat back assembly comprising:
   a head restraint having a head restraint pad and a head restraint mounting post depending therefrom;
   a seat back frame having a vertically oriented frame opening in an upper portion thereof;
   a seat back and suspension module having an upper portion and a vertically oriented module opening in the upper portion, the frame opening and the module opening being in vertical alignment one with the other, wherein the seat back and suspension module comprises a one-piece composite inner carrier substrate having an upper portion and a trim cover having an upper portion, wherein the module opening comprises an opening in each of the upper portion of both of the one-piece composite inner carrier substrate and the trim cover; and
   a head restraint guide sleeve vertically received and retained within the frame opening and the module opening, wherein the head restraint mounting post is received and retained within the head restraint sleeve guide;
   wherein the one-piece composite inner carrier substrate comprises an upper transverse member having a resilient locking pawl disposed adjacent the opening in the one-piece composite inner carrier substrate and the head restraint guide sleeve comprises a tubular member having an outer cylindrical surface, the outer cylindrical surface of the head restraint guide sleeve having a locking tab, wherein when the outer cylindrical surface of the head restraint guide sleeve is received within the opening in the upper transverse portion of the one-piece composite inner carrier substrate, and the locking tab of the head restraint guide sleeve resiliently displaces the resilient locking pawl until fully inserted, upon which the resilient locking pawl mechanically engages the locking tab to prevent withdraw of the head restraint guide sleeve from the aligned opening in the upper transverse portion of the one-piece composite inner carrier substrate.

2. The motor vehicle seating assembly of claim 1, wherein the head restraint guide sleeve received and retained within the frame opening and the module opening of the upper portion of the one-piece composite inner carrier substrate and the upper portion of the seat back frame, respectively, mechanically locks the one-piece composite inner carrier substrate to the seat back frame.

3. The motor vehicle seating assembly of claim 1, wherein the one-piece composite inner carrier substrate is an injection molded component and the opening within the upper portion of the one-piece composite inner carrier substrate is a molded-in opening that receives the head restraint guide sleeve to lock the upper portion of the one-piece inner carrier substrate to the upper portion of the seat back frame.

4. The motor vehicle seating assembly of claim 1, wherein the seat back and suspension module further comprises a foam layer disposed beneath the trim cover and the trim cover comprises an outer perimeter that is attached about an outer perimeter of the one-piece composite inner carrier substrate, wherein the vertically oriented opening in the upper portion of the seat back and suspension module passes through each of an upper portion of the trim cover, an upper portion of the foam layer, and the upper portion of the one-piece composite inner carrier substrate which receives and locks the head restraint guide sleeve in place subsequent assembly of the upwardly extending seat back assembly.

5. The motor vehicle seating assembly of claim 1, wherein the seat back frame comprises a pair of vertically extending side members, an upper transverse member, and a lower transverse member, the upper transverse member comprising the upper portion thereof.

6. The motor vehicle seating assembly of claim 5, wherein the upper transverse member of the seat back frame comprises a U-shaped beam having an upper horizontal flange, a vertical center portion, and a lower horizontal flange, and each of the upper horizontal flange and lower horizontal flanges have vertically aligned openings within which the outer cylindrical surface of the head restraint guide sleeve is fittingly received.

7. The motor vehicle seating assembly of claim 1, wherein the resilient locking pawl comprises a cantilevered and inclined surface extending from the one-piece composite inner carrier substrate toward a peripheral position proximate the aligned opening in the upper transverse member of the one-piece composite inner carrier substrate, the resilient locking pawl having a engaged position and a released position.

8. The motor vehicle seating assembly of claim 1, wherein the upwardly extending seat back assembly further comprises a decorative seat back panel module.

9. The motor vehicle seating assembly of claim 8, wherein the seat back and suspension module is disposed against a forward facing portion of the seat back frame and the decorative seat back panel module is disposed against a rearward facing portion of the seat back frame, wherein the seat back and suspension module is attached to the decorative seat back panel module about a perimeter of each of the seat back and suspension module and the decorative seat back panel module.

10. The motor vehicle seating assembly of claim 9, wherein an outer edge on each side of the seat back and suspension module includes a plurality of vertically aligned molded-in attachment fasteners and each side of the decorative seat back panel module is provided with a pair of vertically extending, forward facing, and opposed side edges that each similarly include a plurality of complementary vertically aligned molded-in attachment receptacles that correspond to and are in alignment with the vertically aligned molded in attachment fasteners of the seat back and suspension module, within which the plurality of vertically aligned molded-in attachment fasteners are received.

11. The motor vehicle seating assembly of claim 1, wherein the head restraint further comprises a pair of depending mounting posts, the upper portion of the seat back and suspension module further comprises a pair of vertically oriented openings, the upper portion of the seat back frame comprises a pair of vertically oriented openings aligned with the pair of vertically oriented openings of the seat back and suspension module, and the upwardly extending seat back further comprises a pair of seat back guide sleeves received and retained within the pair of vertically oriented openings in each of the upper portion of the seat back and suspension module and the seat back frame, within which the pair of head restraint mounting posts is received and retained within the pair of head restraint sleeve guides.

12. A seat back assembly comprising a head restraint, a seat back frame having a frame opening in an upper portion thereof, a seat back and suspension module having a module opening in an upper portion thereof, the frame opening and the module opening being in vertical alignment one with the other, and a head restraint guide sleeve received and retained within the frame opening and the module opening, wherein the seat back and suspension module comprises a one-piece composite inner carrier substrate having an upper transverse member and a resilient locking pawl disposed on the upper transverse member of the one-piece composite inner carrier substrate adjacent an opening in the upper transverse member of the one-piece composite inner carrier substrate and the head restraint guide sleeve comprises a tubular member having an outer cylindrical surface, the outer cylindrical surface of the head restraint guide sleeve having a locking tab, and wherein when the outer cylindrical surface of the head restraint guide sleeve is received within the opening in the upper transverse portion of the one-piece composite inner carrier substrate and the locking tab of the head restraint guide sleeve resiliently displaces the resilient locking pawl until fully inserted, upon which the resilient locking pawl mechanically engages the locking tab to prevent withdraw of the head restraint guide sleeve from the opening in the upper transverse portion of the one-piece composite inner carrier substrate.

13. The seat back assembly of claim 12, wherein the resilient locking pawl comprises a cantilevered portion extending from the one-piece composite inner carrier substrate toward a peripheral position proximate the opening in the upper transverse member of the one-piece composite inner carrier substrate, the resilient locking pawl having an inwardly inclined upper surface, a lower edge, and an engaged position wherein the lower edge engages the locking tab and a released position wherein the lower edge disengages the locking tab.

14. A motor vehicle seating assembly comprising a lower seat assembly and an upwardly extending seat back assembly, the upwardly extending seat back assembly comprising:
a head restraint having a head restraint pad and a head restraint mounting post depending from the head restraint pad;
a seat back frame having a vertically oriented frame opening in an upper portion thereof;
a seat back and suspension module attached to the seat frame, the seat back and suspension module further comprising a one-piece composite inner carrier substrate having a pair of vertically extending side members, an upper transverse member having a vertically oriented module opening, the frame opening and the module opening being in vertical alignment one with the other, and a lower transverse member, wherein an outer edge of each of the side members, upper transverse member, and lower transverse member form an outer perimeter, and a seat back trim cover having an outer perimeter having a plurality of seat back trim cover attachment fasteners disposed about a perimeter of the seat back trim cover at locations corresponding to the discrete locations of the outer perimeter of the inner carrier substrate; and
a head restraint guide sleeve received and retained within the frame opening and the module opening, wherein the head restraint mounting post is received within the head restraint sleeve guide;
wherein the one-piece composite inner carrier substrate is an injection molded component comprising the opening within the upper portion of the one-piece composite inner carrier substrate and a resilient locking pawl disposed adjacent the opening, and the head restraint guide sleeve comprises a tubular member having an outer cylindrical surface and an inner cylindrical cavity, the outer cylindrical surface of the head restraint guide sleeve having a locking tab that is resiliently engaged by the resilient locking pawl mechanically to prevent withdraw of the head restraint guide sleeve from the opening.

15. The motor vehicle seating assembly of claim 14, wherein the resilient locking pawl comprises a cantilevered portion extending from the one-piece composite inner carrier substrate toward a peripheral position proximate the opening in the upper transverse member of the one-piece composite inner carrier substrate, the resilient locking pawl having an inwardly inclined upper surface, a lower edge, and an engaged position wherein the lower edge engages the locking tab and a released position wherein the lower edge disengages the locking tab.

16. The motor vehicle seating assembly of claim 14, wherein the seat back and suspension module further comprises a trim cover and a foam layer disposed beneath the trim cover, the trim cover and foam layer having an overall thickness, an upper portion of the head restraint sleeve guide comprises a trim cover bezel, and the outer cylindrical surface of the head restraint sleeve guide comprises a stop that engages the frame opening of the seat back frame when the head restraint sleeve guide is fully inserted, the stop being disposed opposite the locking tab on the outer cylindrical surface of the head restraint sleeve guide and below the trim cover bezel by a distance corresponding to the overall thickness of the trim cover and foam layer.

* * * * *